(12) United States Patent
Bae

(10) Patent No.: US 11,271,432 B2
(45) Date of Patent: Mar. 8, 2022

(54) WIRELESS POWER CONTROL METHOD AND DEVICE

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/004,397

(22) Filed: Aug. 27, 2020

(65) Prior Publication Data

US 2020/0395787 A1 Dec. 17, 2020

Related U.S. Application Data

(63) Continuation of application No. 16/096,426, filed as application No. PCT/KR2017/002889 on Mar. 17, 2017, now Pat. No. 10,790,693.

(30) Foreign Application Priority Data

May 16, 2016 (KR) ........................ 10-2016-0059667

(51) Int. Cl.
*H02J 50/12* (2016.01)
*H02J 50/80* (2016.01)
*H02J 7/04* (2006.01)

(52) U.S. Cl.
CPC ............. *H02J 50/12* (2016.02); *H02J 7/045* (2013.01); *H02J 50/80* (2016.02); *H02J 2207/20* (2020.01)

(58) Field of Classification Search
USPC ........................................................ 320/108
See application file for complete search history.

(56) References Cited

U.S. PATENT DOCUMENTS

| 9,118,357 | B2 | 8/2015 | Tseng |
| 2011/0124305 | A1 | 5/2011 | Von Novak et al. |
| 2011/0285349 | A1 | 11/2011 | Widmer et al. |
| 2012/0223591 | A1 | 9/2012 | Cheon et al. |
| 2013/0009475 | A1 | 1/2013 | Nunoya et al. |
| 2013/0300352 | A1 | 11/2013 | Kuk et al. |
| 2014/0054971 | A1 | 2/2014 | Kissin et al. |
| 2014/0084701 | A1 | 3/2014 | Bae |
| 2014/0203774 | A1* | 7/2014 | Sawayanagi ............ H02J 50/10 320/108 |

(Continued)

FOREIGN PATENT DOCUMENTS

EP 2 536 002 A1 12/2012
KR 10-2012-0095968 A 8/2012
(Continued)

*Primary Examiner* — Bryce M Aisaka
(74) *Attorney, Agent, or Firm* — Birch, Stewart, Kolasch & Birch, LLP

(57) ABSTRACT

A wireless power control method in a wireless power transmission device for wirelessly transmitting power to a wireless power reception device. The method includes receiving a first control signal from the wireless power reception device at a first time interval; sensing a current within the wireless power transmission device to generate a second control signal at a second time interval; and controlling a wireless power based on the first control signal and the second control signal, and in which the first time interval is longer than the second time interval.

20 Claims, 13 Drawing Sheets

(56) References Cited

U.S. PATENT DOCUMENTS

2017/0317529 A1   11/2017   Smith et al.

FOREIGN PATENT DOCUMENTS

| KR | 10-2012-0100666 A | 9/2012 |
| KR | 10-2013-0087398 A | 8/2013 |
| KR | 10-2014-0040570 A | 4/2014 |
| KR | 10-2014-0071461 A | 6/2014 |
| KR | 10-2015-0046114 A | 4/2015 |
| WO | WO 2013/033834 A1 | 3/2013 |

* cited by examiner

WIRELESS POWER CONTROL METHOD AND DEVICE

CROSS-REFERENCE TO RELATED APPLICATIONS

This Application is a Continuation of U.S. patent application Ser. No. 16/096,426 filed on Oct. 25, 2018 (now U.S. Pat. No. 10,790,693 issued on Sep. 29, 2020), which is the National Phase of PCT International Application No. PCT/KR2017/002889 filed on Mar. 17, 2017, which claims the priority benefit under 35 U.S.C. § 119(a) to Korean Patent Application No. 10-2016-0059667 filed in the Republic of Korea on May 16, 2016, all of which are hereby expressly incorporated by reference into the present application.

BACKGROUND OF THE INVENTION

Field of the Invention

The present invention relates to a wireless charging technology and, specifically, to a wireless power control method in a wireless power transmitter, through which power can be stably supplied to a wireless power reception device even in abruptly changing power transmission environments, and a device therefor.

Discussion of the Related Art

With the recent rapid development of information communication technology, a ubiquitous society based on information communication technology has emerged.

To access information communication devices anytime and anywhere, sensors equipped with a computer chip having a communication function need to be installed in all social facilities. Accordingly, supply of power to these devices or sensors becomes anew issue. In addition, an operation of charging a battery requires time and efforts of a user as the number of types of portable devices such as Bluetooth handsets and music players such as iPods as well as cellular phones abruptly increases. As a method for solving such a problem, a wireless power transmission technology is attracting attention.

Wireless power transmission or wireless energy transfer is a technology for wirelessly transmitting electric energy from a transmitter to a receiver using the principle of magnetic induction. Use of an electric motor or a transformer using the principle of electromagnetic induction began in the 1800s, and methods of transmitting electric energy by radiating radio waves or electromagnetic waves such as lasers have been attempted. Electric toothbrushes and some electric razors frequently used are charged using the principle of electromagnetic induction.

Wireless energy transfer methods developed thus far may be classified into electromagnetic induction, electromagnetic resonance, RF transmission using a short-wavelength radio frequency, etc.

Electromagnetic induction is a technology using the phenomenon that a magnetic flux generated when two coils are placed in proximity to each other and then current flows through one coil causes electromotive force to be generated in the other coil and is rapidly commercialized focusing on small devices such as cellular phones. Electromagnetic induction allows transmission of up to hundreds of kilowatts and has high efficiency but needs to be placed adjacent to a charger or a floor because a maximum transmission distance thereof is 1 cm or less.

Electromagnetic resonance is characterized in that it uses an electric field or a magnetic field instead of electromagnetic waves or current. Electromagnetic resonance is safe with respect to other electronic devices or the human body because it is rarely affected by a problem caused by electromagnetic waves. On the other hand, electromagnetic resonance has shortcomings that it can be used only over a limited distance and space and has relatively low energy transfer efficiency.

Short-wavelength wireless power transmission, simply RF transmission, uses the fact that energy can be directly transmitted and received in the form of radio waves. This technique is an RF power transmission method using a rectenna. Rectenna is a compound word of antenna and rectifier and refers to an element which directly converts RF power to DC power. That is, RF power transmission is a technique of converting AC radio waves into DC, and research on commercialization thereof is actively conducted as the efficiency thereof is improved.

Wireless power transmission may be used in various manners for the whole industries including IT, railroads, and consumer electronics as well as mobile.

In conventional wireless charging systems, wireless power transmission devices receive a feedback signal for power control through communication links established between the wireless power transmission devices and wireless power reception devices and dynamically control power according to the feedback signal.

For example, in the case of the alliance for wireless power (A4WP) standard supporting electromagnetic resonance, a power receiving unit (PRU) periodically transmits a dynamic characteristic parameter packet including required power information to a power transmitting unit (PTU) through a Bluetooth communication channel in a power transmission state. The PTU adaptively controls the intensity of transmitted power on the basis of the received required power information.

Alternatively, in the power matters alliance (PMA) standard supporting electromagnetic induction, a wireless power transmitting unit adaptively controls transmitted power on the basis of power control signals, which includes an increase signal, a decrease signal and a no-change signal, for example, through in-band communication. Here, the increase signal is a signal for requesting operating frequency increase. When an operating frequency increases, the intensity of transmitted power decreases. The decrease signal is a signal for requesting operating frequency increase. When an operating frequency decreases, the intensity of transmitted power increases.

Alternatively, in the wireless power consortium (WPC) standard supporting electromagnetic induction, a wireless power transmitting unit adaptively controls the intensity of transmitted power on the basis of a control error packet received from a wireless power receiving unit at predetermined intervals in a power transmission stage through in-band communication.

As described above, conventional wireless power control methods according to wireless power transmission standards control the intensity of transmitted power only on the basis of a feedback signal received from a wireless power receiving unit. When the conventional wireless power control methods are applied to wireless power receiving units which rapidly move in a charging area, a power control speed is low and thus accurate power control cannot be performed.

SUMMARY OF THE INVENTION

An object of the present invention devised in view of the aforementioned circumstances is to provide a wireless power control method in a wireless power transmission device, and a device therefor.

Another object of the present invention is to provide a wireless power control method optimized for a wireless power reception device which rapidly moves in a chargeable area, and a device therefor.

Yet another object of the present invention is to provide a wireless power transmission device including a feedback circuit configured to adaptively change an output voltage of a power converter according to the intensity of current input to the power converter in a state in which a power supply voltage is fixed.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention may provide a wireless power control method and a device therefor.

A wireless power control method in a wireless power transmission device for wirelessly transmitting power to a wireless power reception device according to one embodiment of the present invention may include: detecting intensity of current flowing between a power supply unit supplying a fixed voltage and a power converter during power transmission to the wireless power reception device; and dynamically controlling the output voltage of the power converter according to the detected intensity of current such that the detected intensity of current is maintained uniform.

Here, the output voltage of the power converter may be controlled by an output voltage of a comparator.

Further, the output voltage of the comparator may be determined by a predetermined reference voltage applied to a negative terminal of the comparator and a voltage applied to a positive terminal thereof in accordance with the detected intensity of current.

Further, the voltage applied to the positive terminal of the comparator may be a voltage applied to a capacitor of an RC circuit which determines a time constant.

For example, the wireless power control method may further include checking whether a charging mode has changed, wherein, when the charging mode has changed, anew predefined reference voltage corresponding to the changed charging mode is applied to the negative terminal of the comparator.

Alternatively, the wireless power control method may further include checking whether the class of the wireless power transmission device has changed, wherein, when the class has changed, a new predefined reference voltage corresponding to the changed class is applied to the negative terminal of the comparator.

Alternatively, the wireless power control method may further include checking whether the category of the wireless power reception device has changed, wherein, when the category has changed, a new predefined reference voltage corresponding to the changed category is applied to the negative terminal of the comparator.

Further, the wireless power control method may further include controlling power according to a predetermined feedback signal when the predetermined feedback signal for power control is received from the wireless power reception device during control of the output voltage of the power converter.

Here, the feedback signal may be a dynamic characteristic parameter packet defined in A4WP standard and received through an out-of-band communication channel.

A wireless power transmission device for wirelessly transmitting power to a wireless power reception device according to another embodiment of the present invention may include: a power converter for converting DC power received from a power supply unit to specific DC power; and a feedback circuit for controlling the output voltage of the power converter such that intensity of current input to the power converter is maintained uniform.

Here, the feedback circuit may include: a current sensor for detecting intensity of current flowing between the power supply unit and the power converter; a comparator for comparing a voltage determined in accordance with the output current of the current sensor with a predetermined reference voltage; and a voltage distribution circuit in which the output voltage of the power converter is controlled according to the output voltage of the comparator.

Further, the output voltage of the comparator may be determined by applying the reference voltage to a negative terminal of the comparator and applying a voltage determined in accordance with the output current of the current sensor to a positive terminal of the comparator.

The voltage applied to the positive terminal of the comparator may be a voltage applied to a capacitor of an RC circuit which determines a time constant.

Further, the wireless power transmission device may further include: a power transmitter for generating an AC signal amplified by the output voltage of the power converter and wirelessly transmitting the AC signal through a transmission coil included therein.

Further, the wireless power transmission device may further include: a control communication unit for controlling power on the basis of a feedback signal received from the wireless power reception device while the feedback circuit controls the output voltage of the power converter.

Further, when a charging mode has changed, the control communication unit may control a new predefined reference voltage corresponding to the changed charging mode to be applied to the negative terminal of the comparator.

Further, when the category of the wireless power reception device has changed, the control communication unit may control a new predefined reference voltage corresponding to the changed category to be applied to the negative terminal of the comparator.

Further, when the class of the wireless power transmission device has changed, the control communication unit may control a new predefined reference voltage corresponding to the changed class to be applied to the negative terminal of the comparator.

Further, the feedback signal may be a dynamic characteristic parameter packet defined in A4WP standard and received through an out-of-band communication channel.

Another embodiment of the present invention may provide a computer-readable recording medium recording a program for executing one of the above-described wireless power control methods.

The above-described aspects of the present invention are merely some of preferred embodiments of the present invention and various embodiments in which technical features of the present invention are reflected may be derived and understood by those skilled in the art on the basis of the following detailed description of the present invention.

Advantageous Effects

The effects of the method and the device according to the present invention are as follows.

The present invention provides a wireless power control method in a wireless power transmission device, and a device therefor.

In addition, the present invention provides a wireless power control method optimized for a wireless power reception device which rapidly moves during charging, and a device therefor.

Furthermore, the present invention provides a wireless power transmission device including a feedback circuit configured to adaptively change an output voltage of a power converter according to the intensity of current input to the power converter in a state in which a power supply voltage is fixed.

Moreover, the present invention provides a wireless power control method and a device therefor capable of maintaining the amount of power transmitted through a transmission coil by maintaining a constant intensity of current input to a power converter through a feedback circuit.

Further, the present invention provides a wireless power control method in a wireless power transmission device capable of preventing in advance the amount of received power from rapidly changing according to abrupt change in a coupling coefficient of a transmission coil and a reception coil.

It will be appreciated by persons skilled in the art that that the effects that could be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Figure 1:
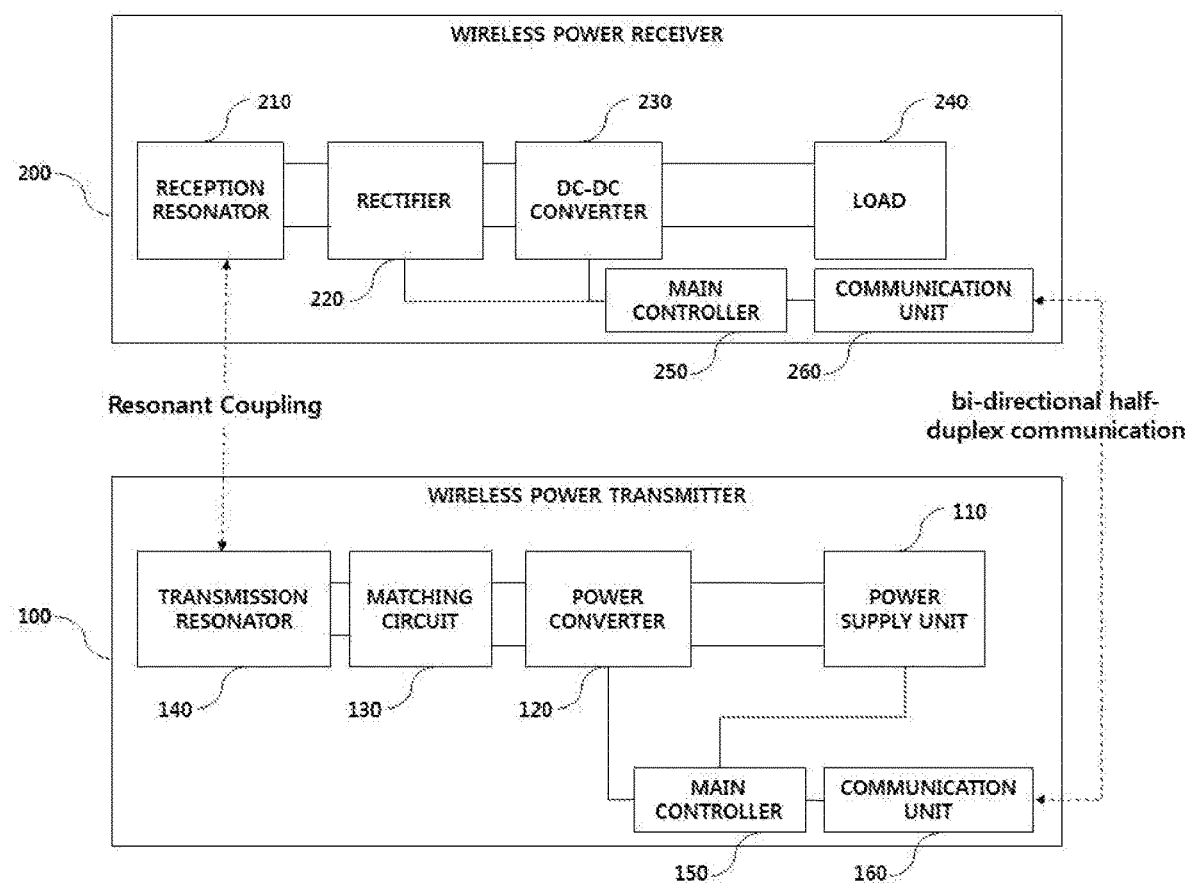
FIG. 1 is a diagram showing a system configuration for describing an electromagnetic resonance wireless power transmission method according to an embodiment of the present invention.

A wireless power control method in a wireless power transmitter which wirelessly transmits power to a wireless power reception device according to an embodiment of the present invention may include a step of detecting the intensity of current flowing between a power supply unit which supplies a fixed voltage and a power converter during power transmission to the wireless power reception device, and a step of dynamically controlling an output voltage of the power converter according to the detected intensity of current such that the detected intensity of current is maintained constant.

Reference will now be made in detail to the embodiments, examples of which are illustrated in the accompanying drawings. The suffixes "module" and "unit" of elements herein are used for convenience of description and thus can be used interchangeably and do not have any distinguishable meanings or functions.

Although all elements constituting the embodiments are described as integrated into a single one or to be operated as a single one, the embodiments is not necessarily limited to such embodiments. According to embodiments, all of the elements may be selectively integrated into one or more and be operated as one or more within the object and the scope of the embodiments. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the embodiments pertain. The computer program may be stored in computer readable media such that the computer program is read and executed by a computer to implement the embodiments. Computer program storage media may include magnetic recording media, optical recording media, and carrier wave media.

In description of exemplary embodiments, it will be understood that, when an element is referred to as being "on" or "under" and "before" or "after" another element, the element can be directly on another element or intervening elements may be present.

The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the embodiments pertain unless mentioned otherwise. Generally used terms, such as terms defined in a dictionary, should be interpreted to coincide with meanings of the related art from the context. Unless differently defined in the embodiments, such terms should not be interpreted in an ideal or excessively formal manner.

It will be understood that, although the terms first, second, A, B, (a), (b), etc. may be used herein to describe various elements of the embodiments, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

In the description of the embodiments, a device for wirelessly transmitting power in a wireless power charging system is interchangeably used with a wireless power transmitter, a wireless power transmission device, a wireless power transmission device, a wireless power transmitter, a transmission end, a transmitter, a transmission device, a transmission side, a wireless power transmission device, a wireless power transmitter, or the like, for convenience of description.

In addition, a device for wirelessly receiving power from a wireless power transmission device is interchangeably used with a wireless power reception device, a wireless power receiver, a wireless power reception device, a wireless power receiver, a reception terminal, a reception side, a reception device, a receiver, or the like, for convenience of description.

A wireless charging device according to the embodiments may be configured in the form of a pad, a holder, an access point (AP), a small eNB, a stand, a ceiling installation type, a wall-mount type, or the like or one transmitter may also transmit power to a plurality of wireless power reception apparatuses.

To this end, a wireless power transmitter may provide at least one wireless power transmission method, for example, an electromagnetic induction method, an electromagnetic resonance method, or the like.

For example, a wireless power transmission method may use various wireless power transmission standards based on an electromagnetic induction method of generating a magnetic field from a power transmission end coil to perform charge using an electromagnetic induction principle whereby electricity is induced from a coil of a reception end due to influence of the magnetic field. Here, the wireless power transmission standard of the electromagnetic induction method may include a wireless charging technology of an electromagnetic induction method defined in the wireless power consortium (WPC) and/or the wireless power consortium (PMA).

As another example, the wireless power transmission method may also use an electromagnetic resonance method of transmitting power to a wireless power receiver positioned within a short distance by synchronizing a magnetic field generated in a transmission coil of the wireless power transmitter with a specific resonance frequency. For example, the electromagnetic resonance method may include a wireless charging technology defined in the alliance for wireless power (A4WP) standard organization as a wireless charging technology standard organization.

As another example, the wireless power transmission method may also use a radio frequency (RF) wireless power transmission method of loading low-power energy to an RF signal and transmitting power to a wireless power receiver positioned at a long distance.

As another example of the embodiments, the wireless power transmitter according the embodiments may be designed to support at least two or more of wireless power transmission methods among the aforementioned electromagnetic induction method, electromagnetic resonance method, and RF wireless power transmission method.

In this case, the wireless power transmitter may determine a wireless power transmission method to be adaptively used for a corresponding wireless power receiver based on a type, state, power requirements, and so on of the wireless power receiver as well as the wireless power transmission method to be supportable by the wireless power transmitter and the wireless power receiver.

A wireless power receiver according to an embodiment may include at least one wireless power transmission method and may simultaneously and wirelessly receive power from two or more wireless power transmitters. Here, the wireless power transmission method may include at least one of the electromagnetic induction method, the electromagnetic resonance method, and the RF wireless power transmission method.

A wireless power receiver according to the present invention may be used in a small electronic device such as a mobile phone, a smartphone, a laptop computer, a digital broadcast terminal, personal digital assistants (PDA), a portable multimedia player (PMP), a navigation device, an MP3 player, an electric toothbrush, an electronic tag, a lighting device, a remote controller, or a float but is not limited and may be any mobile device including a wireless power reception element installed therein to charge a battery. A wireless power receiver according to another embodiment may also be mounted on a vehicle, an unmanned aerial vehicle, an air drone, or the like.

FIG. 1 is a diagram showing a system configuration for describing an electromagnetic resonance wireless power transmission method according to an embodiment of the present invention.

Referring to FIG. 1, a wireless power transmission system may include a wireless power transmitter 100 and a wireless power receiver 200.

Although FIG. 1 shows that the wireless power transmitter 100 transmits wireless power to the single wireless power receiver 200, this is merely one embodiment and the wireless power transmitter 100 according to another embodiment of the present invention may transmit wireless power to a plurality of wireless power receivers 200. A wireless power receiver 200 according to another embodiment may simultaneously receive wireless power from a plurality of wireless power transmitters 100.

The wireless power transmitter 100 may generate a magnetic field using a specific power transmission frequency, for example, a resonant frequency, to transmit power to the wireless power receiver 200.

The wireless power receiver 200 may receive power by tuning to the same frequency as the power transmission frequency used by the wireless power transmitter 100.

For example, the frequency used for power transmission may be 6.78 MHz. However, the present invention is not limited thereto.

That is, the power transmitted by the wireless power transmitter 100 may be delivered to the wireless power receiver 200 which resonates with the wireless power transmitter 100.

The maximum number of wireless power receivers 200 capable of receiving power from a single wireless power transmitter 100 may be determined on the basis of a peak transmission power level of the wireless power transmitter 100, a peak power reception level of the wireless power receiver 200, and physical structures of the wireless power transmitter 100 and the wireless power receiver 200.

The wireless power transmitter 100 and the wireless power receiver 200 may perform bidirectional communication through a frequency band different from a frequency band for wireless power transmission, i.e., resonant frequency band. For example, a half duplex Bluetooth low energy (BLE) communication protocol may be used for bidirectional communication, but the present invention is not limited thereto.

The wireless power transmitter 100 and the wireless power receiver 200 may exchange characteristics and state information thereof, for example, power negotiation information for power control, through bidirectional communication.

For example, the wireless power receiver 200 may transmit predetermined power reception state information for controlling a power level received from the wireless power transmitter 100 to the wireless power transmitter 100 through bidirectional communication, and the wireless power transmitter 100 may dynamically control a transmission power level on the basis of the received power reception state information. Accordingly, the wireless power transmitter 100 can optimize power transmission efficiency and provide a function of preventing loads from being damaged due to overvoltage, a function of preventing unnecessary power waste due to undervoltage, and the like.

In addition, the wireless power transmitter 100 may execute a function of authenticating and identifying the wireless power receiver 200 through bidirectional communication, a function of identifying devices which are not compatible or objects which cannot be charged, and a function of identifying effective loads.

A resonance type wireless power transmission procedure will be described in more detail with reference to FIG. 1.

The wireless power transmitter 100 may include a power supply unit 110, a power converter 120, a matching circuit 130, a transmission resonator 140, a main controller 150 and a communication unit 160. The communication unit may include a data transmitter and a data receiver.

The power supply unit 110 may supply a specific supply voltage to the power converter 120 according to control of the main controller 150. Here, the supply voltage may be a DC voltage or an AC voltage.

The power converter 120 may convert the voltage received from the power supply unit 100 to a specific voltage according to control of the main controller 150. To this end, the power converter 120 may include at least one of a DC/DC converter, an AC/DC converter and a power amplifier.

The matching circuit 130 is a circuit for matching impedances between the power converter 120 and the transmission resonator 140.

The transmission resonator 140 may wirelessly transmit power using a specific resonant frequency according to a voltage supplied from the matching circuit 130.

The wireless power receiver 200 may include a reception resonator 210, a rectifier 220, a DC-DC converter 230, a load 240, a main controller 250 and a communication unit 260. The communication unit may include a data transmitter and a data receiver.

The reception resonator 210 may receive power transmitted according to the transmission resonator 140 through resonance.

The rectifier 220 may execute a function of converting an AC voltage supplied from the reception resonator 210 into a DC voltage.

The DC-DC converter 230 may convert a rectified DC voltage into a specific DC voltage necessary for the load 240.

The main controller 250 may control operations of the rectifier 220 and the DC-DC converter 230 or generate characteristics and state information of the wireless power receiver 200 and control the communication unit 260 to transmit the characteristics and state information of the wireless power receiver 200 to the wireless power transmitter 100. For example, the main controller 250 may monitor output voltages and current intensities at the rectifier 220 and the DC-DC converter 230 to control the operations of the rectifier 220 and the DC-DC converter 230.

Information on the monitored output voltages and current intensities may be transmitted to the wireless power transmitter 100 through the communication unit 260.

Further, the main controller 250 may determine an overvoltage state or an undervoltage state by comparing the rectified DC voltage with a predetermined reference voltage and, when a system error state is detected according to the determination result, transmit the detection result to the wireless power transmitter 100 through the communication unit 260.

In addition, upon detection of the system error state, the main controller 250 may control the operations of the rectifier 220 and the DC-DC converter 230 in order to prevent the load from being damaged or control the power applied to the load 240 using a predetermined overcurrent breaking circuit including a switch and (or) a Zener diode.

Although FIG. 1 shows that the main controller 150 or 250 and the communication unit 160 or 260 of each of the transmitter and the receiver are configured as different modules, this is merely an embodiment and the main controller 150 or 250 and the communication unit 160 or 260 may be configured as one module.

When an event of adding a new wireless power receiver to a charging region during charging, canceling connection with a wireless power receiver being charged, completing charging of a wireless power receiver, or the like is detected, the wireless power transmitter 100 according to an embodiment of the present invention may perform a power redistribution procedure for other wireless power receivers which are charging targets. Here, a power redistribution result may be transmitted to connected wireless power receiver(s) through out-of-band communication.

Figure 2:
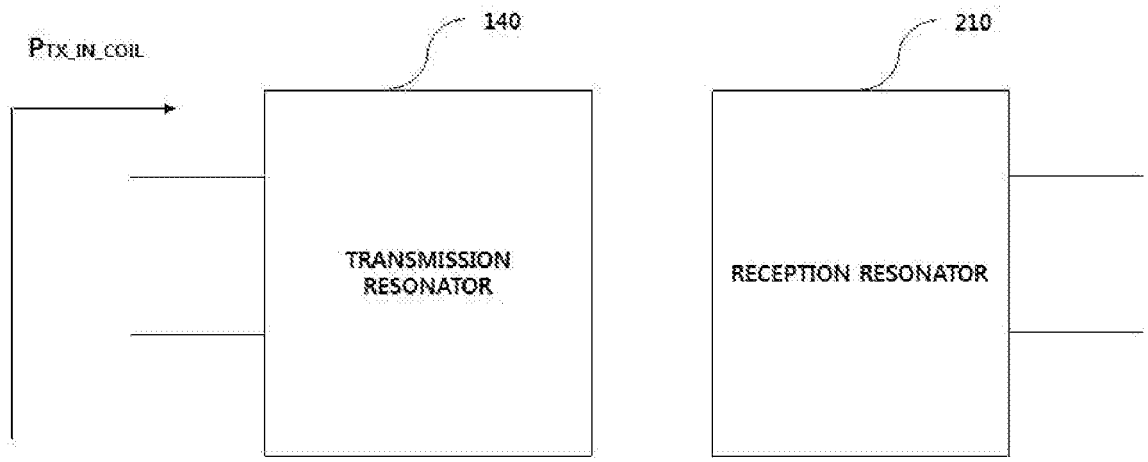
FIG. 2 is a diagram for describing a type and characteristics of a wireless power transmitter in an electromagnetic resonance method according to an embodiment of the present invention.

FIG. 2 is a diagram for describing the type and characteristics of a wireless power transmitter in the electromagnetic resonance method according to an embodiment of the present invention.

Types and characteristics of a wireless power transmitter and a wireless power receiver according to the present invention may be classified according to classes and categories.

The type and characteristics of the wireless power transmitter may be identified through the following three parameters.

First, the wireless power transmitter may be identified by a class determined according to a maximum intensity of power applied to the transmission resonator 140.

Here, the class of the wireless power transmitter may be determined by comparing a maximum value of power $P_{TX\_IN\_COIL}$ applied to the transmission resonator 140 with a predefined maximum input power $P_{TX\_IN\_MAX}$ per class shown in the following wireless power transmission class table which is referred to as Table 1 hereinafter. Here, $P_{TX\_IN\_COIL}$ may be an average real number value obtained by dividing a product of a voltage V(t) and a current I(t) applied to the transmission resonator 140 for a unit time by the unit time.

TABLE 1

| Class | Maximum input power | Minimum category support requirements | Maximum number of supportable devices |
|---|---|---|---|
| Class 1 | 2 W | 1 × class 1 | 1 × class 1 |
| Class 2 | 10 W | 1 × class 3 | 2 × class 2 |
| Class 3 | 16 W | 1 × class 4 | 2 × class 3 |
| Class 4 | 33 W | 1 × class 5 | 3 × class 3 |
| Class 5 | 50 W | 1 × class 6 | 4 × class 3 |
| Class 6 | 70 W | 1 × class 6 | 5 × class 3 |

Classes shown in Table 1 are merely an embodiment and a class may be newly added or deleted. Further, maximum input power, minimum category support requirements and a maximum number of supportable devices may also be changed according to the purpose, shape and implementation form of the wireless power transmitter.

For example, referring to Table 1, when a maximum value of power $P_{TX\_IN\_COIL}$ applied to the transmission resonator 140 is greater than $P_{TX\_IN\_MAX}$ corresponding to class 3 and less than $P_{TX\_IN\_MAX}$ corresponding to class 4, the class of the wireless power transmitter may be determined as class 3.

Second, the wireless power transmitter may be identified according to minimum category support requirements corresponding to the identified class.

Here, minimum category support requirements may be the number of supportable wireless power receivers corresponding to the highest category among categories of wireless power receivers supportable by the wireless power transmitter of the corresponding class. That is, the minimum category support requirements may be a minimum number of maximum-category devices supportable by the corresponding wireless power transmitter. Here, the wireless power transmitter may support wireless power receivers in all categories corresponding to a maximum category or less according to the minimum category support requirements.

However, if the wireless power transmitter can support wireless power receivers in a category higher than the category designated by the minimum category support requirements, supporting the wireless power receivers by the wireless power transmitter may not be limited.

For example, referring to Table 1, a wireless power transmitter having class 3 needs to support at least one wireless power receiver in category 5. In this case, the wireless power transmitter can support a wireless power receiver 100 corresponding to a lower category than the category corresponding to the minimum category support requirements.

In addition, the wireless power transmitter may support a wireless power receiver in a higher category upon determining the wireless power transmitter can support a higher category than the category corresponding to the minimum category support requirements.

Third, the wireless power transmitter may be identified by a maximum number of supportable devices corresponding to the identified class. Here, the maximum number of supportable devices may be identified by a maximum number of supportable wireless power receivers corresponding to the lowest category among categories supportable at the corresponding class, which is simply referred to as a maximum number of supportable devices hereinafter.

For example, referring to Table 1, a wireless power transmitter having class 3 needs to support a maximum of two wireless power receivers of minimum category 3.

However, when the wireless power transmitter can support more than the maximum number of devices corresponding to the class thereof, supporting more than the maximum number of devices is not limited.

The wireless power transmitter according to the present invention needs to perform wireless power transmission for at least the numbers defined in Table 1 within available power when there is no particular reason for not accepting a power transmission request of a wireless power receiver.

For example, the wireless power transmitter may not accept a power transmission request of a wireless power receiver when no available power for accepting the power transmission request remains. Otherwise, the wireless power transmitter may control power adjustment of the wireless power receiver.

Alternatively, the wireless power transmitter may not accept a power transmission request of a wireless power receiver if the number of wireless power receivers exceeds the number of supportable wireless power receivers when the wireless power transmitter accepts the power transmission request.

Alternatively, the wireless power transmitter may not accept a power transmission request of a wireless power receiver when the category of the wireless power receiver exceeds the category level supportable at the class of the wireless power transmitter.

Alternatively, the wireless power transmitter may not accept a power transmission request of a wireless power receiver when the internal temperature thereof exceeds a reference value.

Particularly, the wireless power transmitter according to the present invention may perform the power redistribution procedure on the basis of the amount of currently available power. Here, the power redistribution procedure may be performed in further consideration of at least one of the category, wireless power reception state, required amount of power, priority and the amount of power consumed by a wireless power receiver that is a power transmission target, which will be described later.

Here, information on at least one of the category, wireless power reception state, required amount of power, priority and the amount of power consumed by the wireless power receiver may be transmitted from the wireless power receiver to the wireless power transmitter by means of at least one control signal through an out-of-band communication channel.

Upon completion of the power redistribution procedure, the wireless power transmitter may transmit the power redistribution result to the corresponding wireless power receiver through out-of-band communication.

The wireless power receiver may recalculate estimated time required to complete charging on the basis of the received power redistribution result and transmit the recalculation result to a microprocessor of an electronic apparatus connected thereto. Subsequently, the microprocessor may control a display included in the electronic apparatus to display the recalculated estimated time required to complete charging. Here, the displayed estimated time required to complete charging may be controlled to disappear after being displayed on a screen for a predetermined time.

When the estimated time required to complete charging is recalculated, a microprocessor according to another embodiment of the present invention may control the recalculated estimated time required to complete charging to be displayed along with information about the reason for recalculation. To this end, the wireless power transmitter may transmit the power redistribution result along with information about the reason of occurrence of power redistribution to the wireless power receiver.

Figure 3:
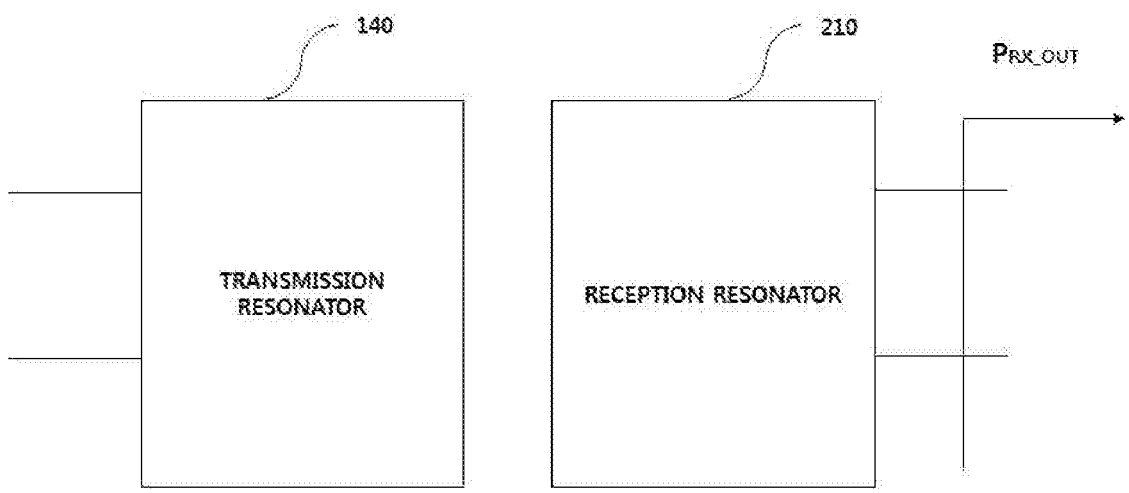
FIG. 3 is a diagram for describing a type and characteristics of a wireless power receiver in the electromagnetic resonance method according to an embodiment of the present invention.

FIG. 3 is a diagram for describing the type and characteristics of a wireless power receiver in the electromagnetic resonance method according to an embodiment of the present invention.

As shown in FIG. 3, average output power $P_{RX\_OUT}$ of the reception resonator 210 may be a real number value obtained by dividing a product of a voltage V(t) and a current I(t) output by the reception resonator 210 for a unit time by the unit time.

Categories of wireless power receivers may be defined on the basis of maximum output power $P_{RX\_OUT\_MAX}$ of the reception resonator 210, as shown in the following table 2.

TABLE 2

| Category | Maximum input power | Application example |
|---|---|---|
| Category 1 | TBD | Bluetooth handset |
| Category 2 | 3.5 W | Feature phone |
| Category 3 | 6.5 W | Smartphone |
| Category 4 | 13 W | Tablet |
| Category 5 | 25 W | Small laptop |
| Category 6 | 37.5 W | Laptop |
| Category 6 | 50 W | TBD |

For example, when charging efficiency in a load stage is 80% or higher, a wireless power receiver in category 3 may supply power of 5 W to a charging port of a load.

The categories shown in Table 2 are merely an embodiment and a category may be newly added or deleted. In addition, maximum output power and an application example per category may also be changed according to the purpose, shape and implementation form of a wireless power receiver.

Figure 4:
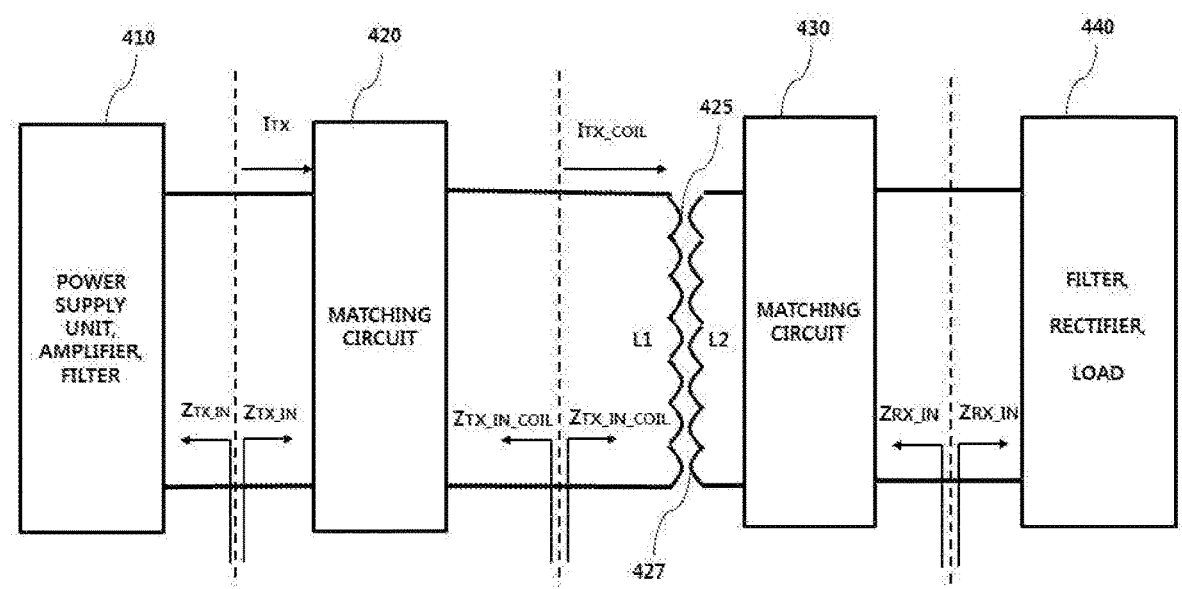
FIG. 4 is an equivalent circuit diagram of a wireless power transmission system in the electromagnetic resonance method according to an embodiment of the present invention.

FIG. 4 is an equivalent circuit diagram of a wireless power transmission system supporting the electromagnetic resonance method according to an embodiment of the present invention.

Specifically, FIG. 4 shows interface points in an equivalent circuit at which reference parameters which will be described later are measured.

Hereinafter, meanings of the reference parameters shown in FIG. 4 will be described.

$I_{TX}$ and $I_{TX\_COIL}$ refer to a root mean square (RMS) current applied to a matching circuit (or matching network) 420 of a wireless power transmitter and an RMS current applied to a transmission resonator coil 425 of the wireless power transmitter, respectively.

$Z_{TX\_IN}$ refers to an input impedance at the rear end of the matching circuit 420 and at the front end of the transmission resonator coil 425.

$Z_{TX\_IN\_COIL}$ refers to an input impedance at the rear end of the matching circuit 420 and the front end of the transmission resonator coil 425.

L1 and L2 refer to an inductance value of the transmission resonator coil 425 and an inductance value of a reception resonator coil 427, respectively.

$Z_{RX\_IN}$ refers to an input impedance at the rear end of a matching circuit 430 of a wireless power receiver and an input impedance at the front end of a filter/rectifier/load 440 of the wireless power receiver.

A resonant frequency used for the operation of the wireless power transmission system according to an embodiment of the present invention may be 6.78 MHz±15 kHz.

Further, the wireless power transmission system according to an embodiment may provide simultaneous charging, that is, multi-charging for a plurality of wireless power receivers. In this case, even when a wireless power receiver is newly added or deleted, reception power variations of remaining wireless power receivers may be controlled not to exceed a predetermined reference value. For example, a reception power variation may be ±10% but the present invention is not limited thereto. If it is impossible to control reception power variations not to exceed the reference value, a wireless power transmitter may not accept a power transmission request from a newly added wireless power receiver.

To maintain reception power variations, a wireless power receiver should not overlap with existing wireless power receivers when the wireless power receiver is added or deleted.

When the matching circuit 430 of the wireless power receiver is connected to the rectifier, the real part of $Z_{TX\_IN}$ may be inversely proportional to load resistance of the rectifier, which is referred to as $R_{RECT}$ hereinafter. That is, increase in $R_{RECT}$ may decrease $Z_{TX\_IN}$, and decrease in $R_{RECT}$ may increase $Z_{TX\_IN}$.

Resonator coupling efficiency according to the present invention may be a maximum power reception ratio calculated by dividing power transferred from a reception resonator coil to the load 440 by power applied by the transmission resonator coil 425 to a resonant frequency band. Resonator coupling efficiency between the wireless power transmitter and the wireless power receiver may be calculated when the reference port impedance $Z_{TX\_IN}$ of the transmission resonator perfectly matches the reference port impedance $Z_{RX\_IN}$ of the reception resonator.

The following table 3 shows an example of minimum resonator coupling efficiencies according to classes of wireless power transmitters and classes of wireless power receivers according to an embodiment of the present invention.

TABLE 3

| | Category 1 | Category 2 | Category 3 | Category 4 | Category 5 | Category 6 | Category 7 |
|---|---|---|---|---|---|---|---|
| Class 1 | N/A | N/A | N/A | N/A | N/A | N/A | N/A |
| Class 2 | N/A | 74%(−1.3) | 74%(−1.3) | N/A | N/A | N/A | N/A |
| Class 3 | N/A | 74%(−1.3) | 74%(−1.3) | 76%(−1.2) | N/A | N/A | N/A |
| Class 4 | N/A | 50%(−3) | 65%(−1.9) | 73%(−1.4) | 76%(−1.2) | N/A | N/A |
| Class 5 | N/A | 40%(−4) | 60%(−2.2) | 63%(−2) | 73%(−1.4) | 76%(−1.2) | N/A |
| Class 5 | N/A | 30%(−5.2) | 50%(−3) | 54%(−2.7) | 63%(−2) | 73%(−1.4) | 76%(−1.2) |

If a plurality of wireless power receivers is used, minimum resonator coupling efficiencies corresponding to the classes and categories shown in Table 3 may increase.

Figure 5:
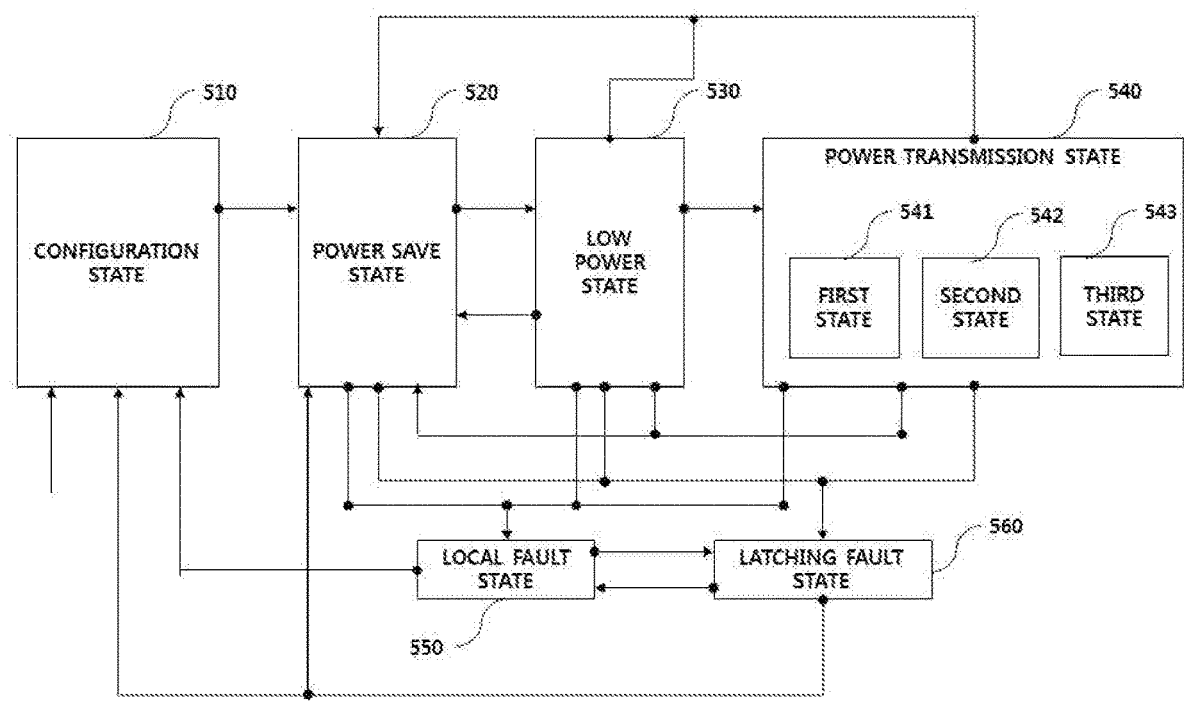
FIG. 5 is a state transition diagram for describing a wireless power transmitter state transition procedure in the electromagnetic resonance method according to an embodiment of the present invention.

FIG. 5 is a state transition diagram for describing a state transition procedure in a wireless power transmitter supporting the electromagnetic resonance method according to an embodiment of the present invention.

Referring to FIG. 5, states of a wireless power transmitter may include a configuration state 510, a power save state 520, a low power state 530, a power transfer state 540, a local fault state 550 and a latching fault state 560.

When power is applied to the wireless power transmitter, the wireless power transmitter may switch to the configuration state 510. When a predetermined rest timer expires or an initialization procedure is completed in the configuration state 510, the wireless power transmitter may switch to the power save state 520.

In the power save state 520, the wireless power transmitter may generate a beacon sequence and transmit the beacon sequence through a resonant frequency band.

Here, the wireless power transmitter may control the beacon sequence to start within a predetermined time after transition to the power save state 520. For example, the wireless power transmitter may control the beacon sequence to start within 50 ms after transition to the power save state 520. However, the present invention is not limited thereto.

In the power save state 520, the wireless power transmitter may periodically generate and transmit a first beacon sequence for detecting a wireless power receiver and detect an impedance variation of a reception resonator, that is, a load variation. Hereinafter, the first beacon and the first beacon sequence are referred to as a short beacon and a short beacon sequence for convenience of description.

Particularly, the short beacon sequence may be repeatedly generated and transmitted at predetermined intervals $t_{CYCLE}$ for a short period $t_{SHORT\_BEACON}$ such that standby power of the wireless power transmitter can be saved until a wireless power receiver is detected. For example, $t_{SHORT\_BEACON}$ may be set to 30 ms or less and $t_{CYCLE}$ may be set to 250 ms±5 ms. Further, the current intensity of the short beacon may be equal to or greater than a predetermined reference value and may gradually increase for a predetermined period of time. For example, minimum current intensity of the short beacon may be set to a sufficiently large value such that wireless power receivers in category 2 or higher in Table 2 can be detected.

The wireless power transmitter according to the present invention may include a predetermined sensing means for sensing variations in reactance and resistance in a reception resonator according to the short beacon.

Furthermore, in the power save state 520, the wireless power transmitter may periodically generate and transmit a second beacon sequence for supplying sufficient power necessary for booting and response of a wireless power receiver. Hereinafter, the second beacon and the second beacon sequence are referred to as a long beacon and a long beacon sequence for convenience of description.

That is, booting of a wireless power receiver is completed through the second beacon sequence, the wireless power receiver may broadcast a predetermined response signal through an out-of-band communication channel.

Particularly, the long beacon sequence may be generated and transmitted at predetermined intervals $t_{LONG\_BEACON\_PERIOD}$ for a long period $t_{LONG\_BEACON}$ longer than the short beacon such that sufficient power necessary for booting of the wireless power receiver is supplied. For example, $t_{LONG\_BEACON}$ may be set to 105 mx+5 ms, $t_{LONG\_BEACON\_PERIOD}$ may be set to 850 ms, and the current intensity of the long beacon may be stronger than the current intensity of the short beacon. Further, the long beacon may maintain power of predetermined intensity for a transmission period.

Thereafter, the wireless power transmitter may wait for reception of a predetermined response signal for a long beacon transmission period after detection of an impedance variation in a reception resonator. Hereinafter, the response signal is referred to as an advertisement signal for convenience of description. Here, a wireless power receiver may broadcast the advertisement signal through an out-of-band communication frequency band different from the resonant frequency band.

For example, the advertisement signal may include at least one of message identification information for identifying a message defined in the corresponding out-of-band communication standard, service or wireless power receiver identification information for identifying whether a wireless power receiver is valid or compatible with a corresponding wireless power transmitter, information on output power of the wireless power receiver, information on a rated voltage/current applied to a load, antenna gain information of the wireless power receiver, information for identifying the category of the wireless power receiver, wireless power receiver authentication information, information about whether an overvoltage protection function is provided, and information on the version of software installed in the wireless power receiver.

Upon reception of the advertisement signal, the wireless power transmitter may establish an out-of-band communication link with the wireless power receiver after switching to the low power state 530 from the power save state 520. Subsequently, the wireless power transmitter may perform a procedure of registering the wireless power receiver through the established out-of-band communication link. For example, when out-of-band communication is Bluetooth low-power communication, the wireless power transmitter may perform Bluetooth pairing with the wireless power receiver and exchange at least one of state information, characteristic information and control information with the wireless power receiver through the paired Bluetooth link.

When the wireless power transmitter transmits a predetermined control signal for starting charging, that is, a predetermined control signal for requesting the wireless power receiver to transfer power to a load, to the wireless power receiver through out-of-band communication in the low power state 530, the state of the wireless power transmitter may switch from the low power state 530 to the power transfer state 540.

If the out-of-band communication link establishment procedure or the registration procedure is not normally completed in the low power state 530, the state of the wireless power transmitter may switch from the low power state 530 to the power save state 520.

In the wireless power transmitter, a separate link expiration timer for connection with each wireless power receiver may be operated. A wireless power receiver needs to transmit a predetermined message indicating presence thereof to the wireless power transmitter at predetermined intervals before expiration of the link expiration timer. The link expiration timer is reset whenever the message is received and the out-of-band communication link established between the wireless power transmitter and the wireless power receiver can be maintained.

If all link expiration timers corresponding to out-of-band communication links established between the wireless power transmitter and one or more wireless power receivers expire in the low power state 530 or the power transfer state 540, the state of the wireless power transmitter may switch to the power save state 520.

Further, the wireless power transmitter in the low power state 530 may drive a predetermined registration timer upon reception of a valid advertisement signal from a wireless power receiver. Here, when the registration timer expires, the wireless power transmitter may switch to the power save state 520. Here, the wireless power transmitter may output a predetermined notification signal for indicating failure of registration through a notification means, for example, an LED lamp, a display screen, a beeper or the like, included in the wireless power transmitter.

Further, when charging of all wireless power receivers connected to the wireless power transmitter is completed in the power transfer state 540, the wireless power transmitter may switch to the low power state 530.

Particularly, the wireless power transmitter may permit registration of a new wireless power receiver in states other than the configuration state 510, the local fault state 550 and the latching fault state 560.

Further, the wireless power transmitter may dynamically control transfer power on the basis of state information received from a wireless power receiver in the power transfer state 540.

Here, receiver state information transmitted from a wireless power receiver to the wireless power transmitter may include at least one of information on required power, information on a voltage and/or a current measured at the rear end of a rectifier, charging state information, information for notifying of overcurrent, overvoltage and/or overheat states, and information indicating whether a means for blocking or reducing power transferred to a load according to overcurrent or overvoltage has been activated. Here, the receiver state information may be transmitted in a predetermined period or transmitted whenever a specific event occurs. Further, the aforementioned means for blocking or reducing power transferred to a load according to overcurrent or overvoltage may be provided using at least one of an ON/OFF switch and a Zener diode.

Receiver state information transmitted from a wireless power receiver to a wireless power transmitter according to another embodiment of the present invention may further include at least one of information indicating that an external power supply has been connected to the wireless power receiver in a wired manner and information indicating that an out-of-band communication method has been changed, for example, change from NFC (Near Field Communication) to BLE (Bluetooth Low Energy) communication.

A wireless power transmitter according to another embodiment of the present invention may adaptively determine power intensity per wireless power receiver on the basis of at least one of power currently available for the wireless power transmitter, priority per wireless power receiver and the number of connected wireless power receivers. Here, the power intensity per wireless power receiver may be determined as a ratio of power required to be received to maximum power which can be processed by a rectifier of the corresponding wireless power receiver.

Here, priority per wireless power receiver may be determined according to intensity of power required by a receiver, receiver type, whether the receiver is currently used, current charge amount, the amount of power currently consumed, and the like. However, the present invention is not limited thereto. For example, priority per receiver type may be determined in the order of a cellular phone, a tablet, a Bluetooth headset and an electric toothbrush. However, the present invention is not limited thereto. As another example, when a receiver is currently used, the receiver may be assigned higher priority than priority assigned to a receiver which is not used. As another example, higher priority may be assigned to a receiver when the receiver requires higher power. As another example, priority may be determined on the basis of a current charge amount of a load, that is, remaining charge amount, in the corresponding receiver. As another example, priority may be determined on the basis of the amount of power currently consumed. Further, priority may be determined by at least one combination of the aforementioned priority determination factors.

Thereafter, the wireless power transmitter may transmit a predetermined power control command including information about the determined power intensity to the corresponding wireless power receiver. Here, the wireless power receiver may determine whether power can be controlled with the power intensity determined by the wireless power transmitter and transmit a determination result to the wireless power transmitter through a predetermined power control response message.

A wireless power receiver according to another embodiment of the present invention may transmit predetermined receiver state information indicating whether wireless power control is possible according to a power control command of the wireless power transmitter prior to reception of the power control command.

The power transfer state 540 may be one of a first state 541, a second state 542 and a third state 543 according to a power reception state of a connected wireless power receiver.

For example, the first state 541 may refer to a state in which the power reception states of all wireless power receivers connected to the wireless power transmitter are normal voltages.

The second state 542 may refer to a state in which the power reception state of at least one wireless power receiver connected to the wireless power transmitter is a low voltage state and there is no wireless power receiver in a high voltage state.

The third state 543 may refer to a state in which the power reception state of at least one wireless power receiver connected to the wireless power transmitter is a high voltage state.

The wireless power transmitter may switch to the latching fault state 560 when a system error is detected in the power save state 520, the low power state 530 or the power transfer state 540.

The wireless power transmitter in the latching fault state 560 may switch to the configuration state 510 or the power save state 520 upon determining that all wireless power receivers connected thereto have been eliminated from a charging region.

Further, the wireless power transmitter in the latching fault state 560 may switch to the local fault state 550 when a local fault is detected. Here, the wireless power transmitter in the local fault state 550 may switch to the latching fault state 560 again when the local fault is canceled.

When the wireless power transmitter has switched from any one of the power save state 520, the low power state 530 and the power transfer state 540 to the local fault state 550, the wireless power transmitter may switch to the configuration state 510 upon cancellation of a local fault.

When the wireless power transmitter has switched to the local fault state 550, power supplied to the wireless power transmitter may be cut. For example, the wireless power transmitter may switch to the local fault state 550 when a fault such as overvoltage, overcurrent or overheat is detected. However, the present invention is not limited thereto.

For example, the wireless power transmitter may transmit a predetermined power control command for decreasing the intensity of power received by a wireless power receiver to at least one wireless power receiver connected thereto when overvoltage, overcurrent or overheat is detected.

Alternatively, the wireless power transmitter may transmit a predetermined control command for stopping charging of wireless power receivers to at least one wireless power receiver connected thereto when overvoltage, overcurrent or overheat is detected.

The wireless power transmitter may prevent device damage due to overvoltage, overcurrent or overheat through the above-described power control procedure.

The wireless power transmitter may switch to the latching fault state 560 when the intensity of output current of the transmission resonator is equal to or greater than a reference value. Here, the wireless power transmitter which has switched to the latching fault state 560 may attempt to perform an operation such that the intensity of output current of the transmission resonator becomes less than the reference value for a predetermined time. Here, the attempt may be repeated by a predetermined number of times. When the latching fault state 560 is not canceled in spite of repeated attempts, the wireless power transmitter may transmit a predetermined notification signal indicating that the latching fault state 560 is not canceled to a user using a predetermined notification means. Here, all wireless power receivers positioned in the charging region of the wireless power transmitter are eliminated from the charging region by the user, the latching fault state 560 may be canceled.

On the other hand, when the intensity of output current of the transmission resonator decreases to below the reference value within the predetermined time or while the attempt is performed the predetermined number of times, the latching fault state 560 may be automatically canceled. Here, the state of the wireless power transmitter automatically switches from the latching fault state 560 to the power save state 520 and thus a procedure of detecting and identifying wireless power receivers may be performed again.

The wireless power transmitter in the power transfer state 540 may continuously transmit power and adaptively control transmitted power on the basis of state information of a wireless power receiver and predefined optimal voltage region setting parameters.

For example, the optimal voltage region setting parameters may include at least one of a parameter for identifying a low voltage region, a parameter for identifying an optimal voltage region, a parameter for identifying a high voltage region and a parameter for identifying an overvoltage region.

The wireless power transmitter may increase transmitted power when the power reception state of a wireless power receiver is in a low voltage region and decrease transmitted power when the power reception state is in a high voltage region.

Further, the wireless power transmitter may control transmitted power such that power transmission efficiency is maximized.

In addition, the wireless power transmitter may control transmitted power such that a deviation in the amount of power required by a wireless power receiver becomes less than a reference value.

Furthermore, the wireless power transmitter may stop power transmission when a rectifier output voltage of a wireless power receiver arrives at a predetermined overvoltage region, that is, when an overvoltage is detected.

Figure 6:
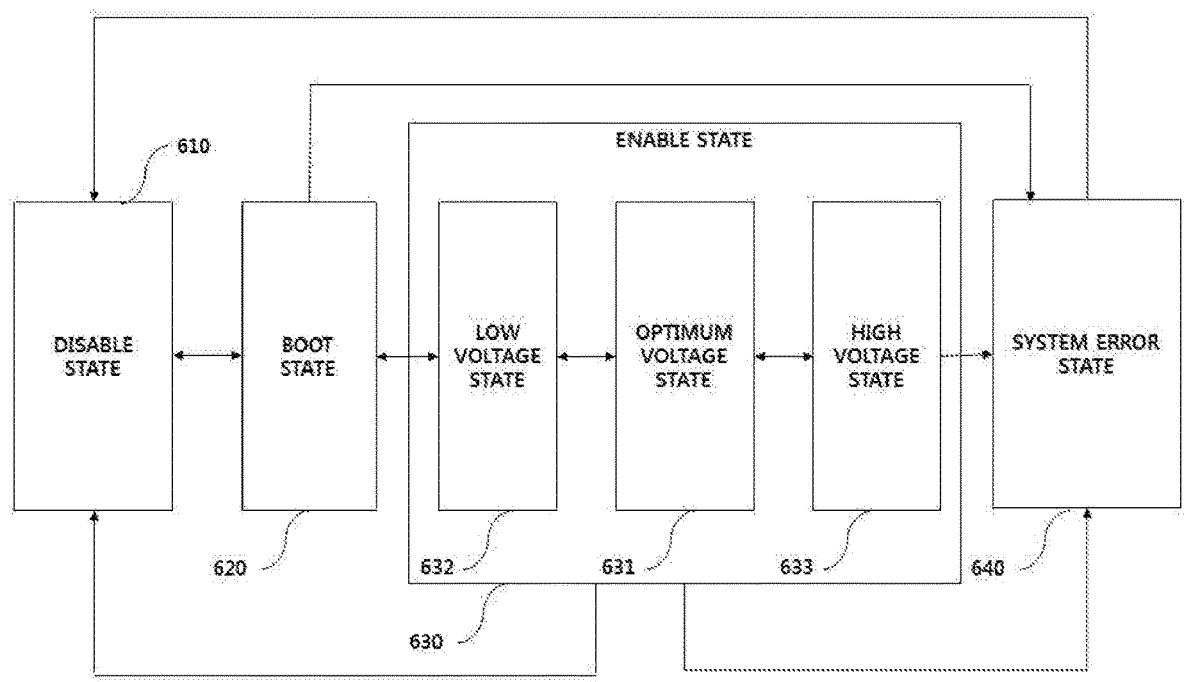
FIG. 6 is a state transition diagram of a wireless power receiver supporting the electromagnetic resonance method according to an embodiment of the present invention.

FIG. 6 is a state transition diagram of a wireless power receiver supporting the electromagnetic resonance method according to an embodiment of the present invention.

Referring to FIG. 6, states of the wireless power receiver may include a disable state 610, a boot state 620, an enable state (or on state) 630 and a system error state 640.

Here, a state of the wireless power receiver may be determined on the basis of the intensity of an output voltage, which is referred to as $V_{RECT}$ for convenience of description, at a rectifier of the wireless power receiver.

The enable state 630 may be divided into an optimum voltage state 631, a low voltage state 632 and a high voltage state 633 according to the value of $V_{RECT}$.

The wireless power receiver in the disable state 610 may switch to the boot state 620 when a measured value of $V_{RECT}$ is equal to or greater than a predefined value of $V_{RECT\_BOOT}$.

In the boot state 620, the wireless power receiver may establish an out-of-band communication link with a wireless power transmitter and wait until $V_{RECT}$ reaches power required by a load.

The wireless power receiver in the boot state 620 may switch to the enable state 630 and start charging upon confirmation that $V_{RECT}$ has reached the power required by the load.

The wireless power receiver in the enable state 630 may switch to the boot state 620 upon confirmation of completion of charging or suspension of charging.

Further, the wireless power receiver in the enable state 630 may switch to the system error state 640 when a predetermined system error is detected. Here, system errors may include predefined system error conditions as well as overvoltage, overcurrent and overheat.

In addition, the wireless power receiver in the enable state 630 may switch to the disable state 610 when $V_{RECT}$ decreases to below $V_{RECT\_BOOT}$.

Further, the wireless power receiver in the boot state 620 or the system error state 640 may switch to the disable state 610 when $V_{RECT}$ decreases to below $V_{RECT\_BOOT}$.

Hereinafter, state transition of the wireless power receiver in the enable state 630 will be described in detail with reference to FIG. 7.

Figure 7:
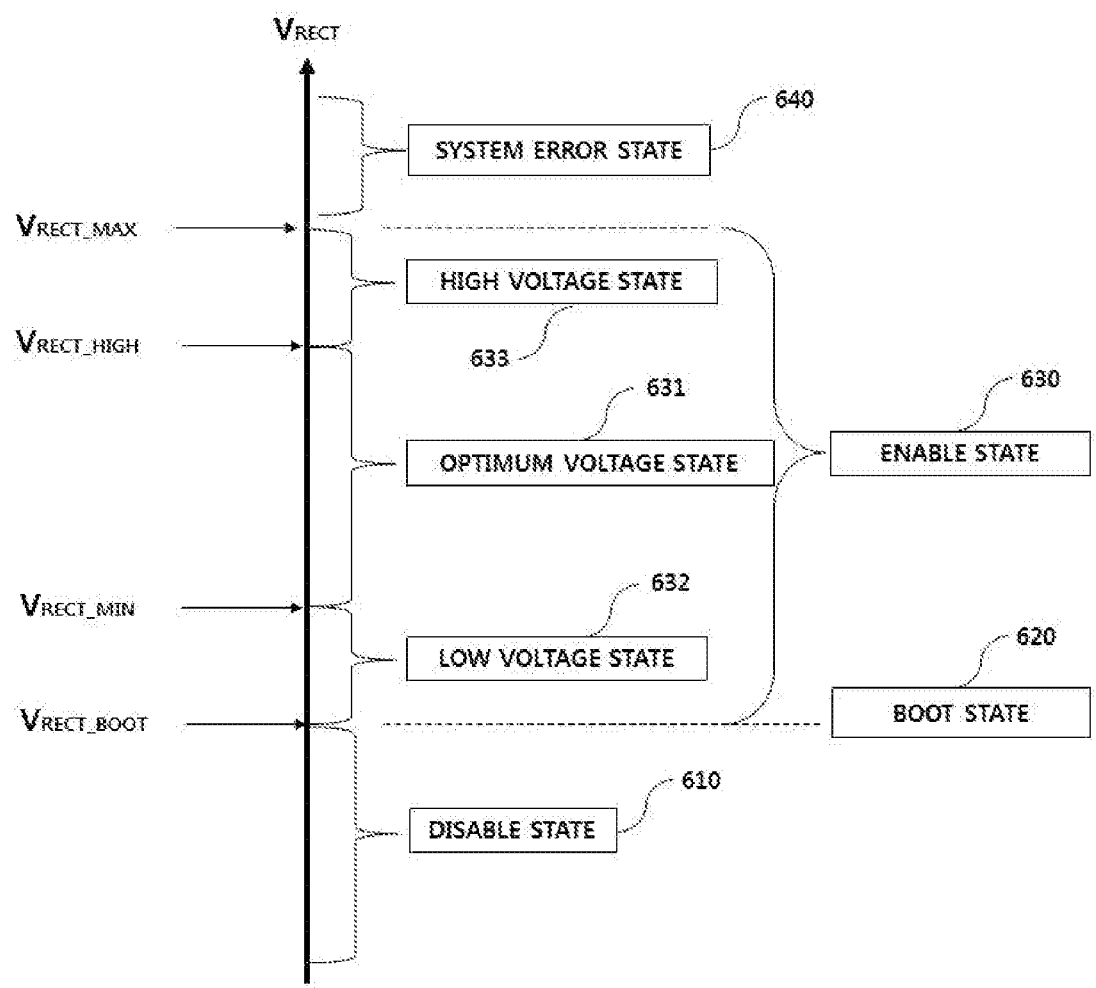
FIG. 7 is a diagram for describing an operation region of a wireless power receiver according to $V_{RECT}$ in the electromagnetic resonance method according to an embodiment of the present invention.

FIG. 7 is a diagram for describing an operation region of a wireless power receiver according to $V_{RECT}$ in the electromagnetic resonance method according to an embodiment of the present invention.

Referring to FIG. 7, the wireless power receiver is maintained in the disable state 610 when $V_{RECT}$ is less than $V_{RECT\_BOOT}$.

When $V_{RECT}$ increases to over $V_{RECT\_BOOT}$, the wireless power receiver may switch to the boot state 620 and broadcast an advertisement signal within a previously designated time. Thereafter, when the advertisement signal is detected by a wireless power transmitter, the wireless power transmitter may transmit a predetermined connection request signal for establishing an out-of-band communication link to the wireless power receiver.

The wireless power receiver may wait until $V_{RECT}$ reaches a minimum output voltage at the rectifier for normal charging, which is referred to as $V_{RECT\_MIN}$ for convenience of description, when the out-of-band communication link is normally established and registration is successfully performed.

When $V_{RECT}$ exceeds $V_{RECT\_MIN}$, the state of the wireless power receiver may switch from the boot state 620 to the enable state 630 and start charging.

If $V_{RECT}$ exceeds $V_{RECT\_MAX}$ which is a predetermined reference value for determining an overvoltage in the enable state 630, the wireless power receiver may switch to the system error state 640 from the enable state 630.

Referring to FIG. 7, the enable state 630 may be divided into the low voltage state 632, the optimum voltage state 631 and the high voltage state 633 according to the value of $V_{RECT}$.

The low voltage state 632 may refer to a state in which $V_{RECT\_BOOT} \le V_{RECT} \le V_{RECT\_MIN}$, the optimum voltage state 631 may refer to a state in which $V_{RECT\_MIN} < V_{RECT} \le V_{RECT\_HIGH}$ and the high voltage state 633 may refer to a state in which $V_{RECT\_HIGH} < V_{RECT} \le V_{RECT\_MAX}$.

Particularly, the wireless power receiver switched to the high voltage state 633 may reserve an operation of cutting power supplied to a load for a previously designated time, which is referred to as a high voltage state maintenance time for convenience of description. Here, the high voltage maintenance time may be determined in advance such that the wireless power receiver and the load are not damaged in the high voltage state 633.

The wireless power receiver may transmit a predetermined message indicating generation of overvoltage to the wireless power transmitter through the out-of-band communication link within a previously designated time upon switching to the system error state 640.

Further, the wireless power receiver may control a voltage applied to the load using an overvoltage cutoff means included therein in order to prevent the load from being damaged due to overvoltage in the system error state 640. Here, an ON/OFF switch and/or a Zener diode may be used as the overvoltage cutoff means.

Although the method and means for coping with a system error in a wireless power receiver when overvoltage is generated in the wireless power receiver and thus the wireless power receiver switches to the system error state 640 have been described in the above-described embodiment, this is merely an embodiment and a wireless power receiver may also switch to the system error state due to overheat or overcurrent generated in the wireless power receiver in other embodiments of the present invention.

For example, when the wireless power receiver switches to the system error state due to overheat, the wireless power receiver may transmit a predetermined message indicating generation of overheat to the wireless power transmitter. Here, the wireless power receiver may reduce heat generated therein by driving a cooling fan or the like included therein.

A wireless power receiver according to another embodiment of the present invention may receive wireless power in association with a plurality of wireless power transmitters. In this case, the wireless power receiver may switch to the system error state 640 upon determining that a wireless power transmitter determined to actually transmit wireless power to the wireless power receiver differs from a wireless power transmitter with which an actual out-of-band communication link has been established.

Figure 8:
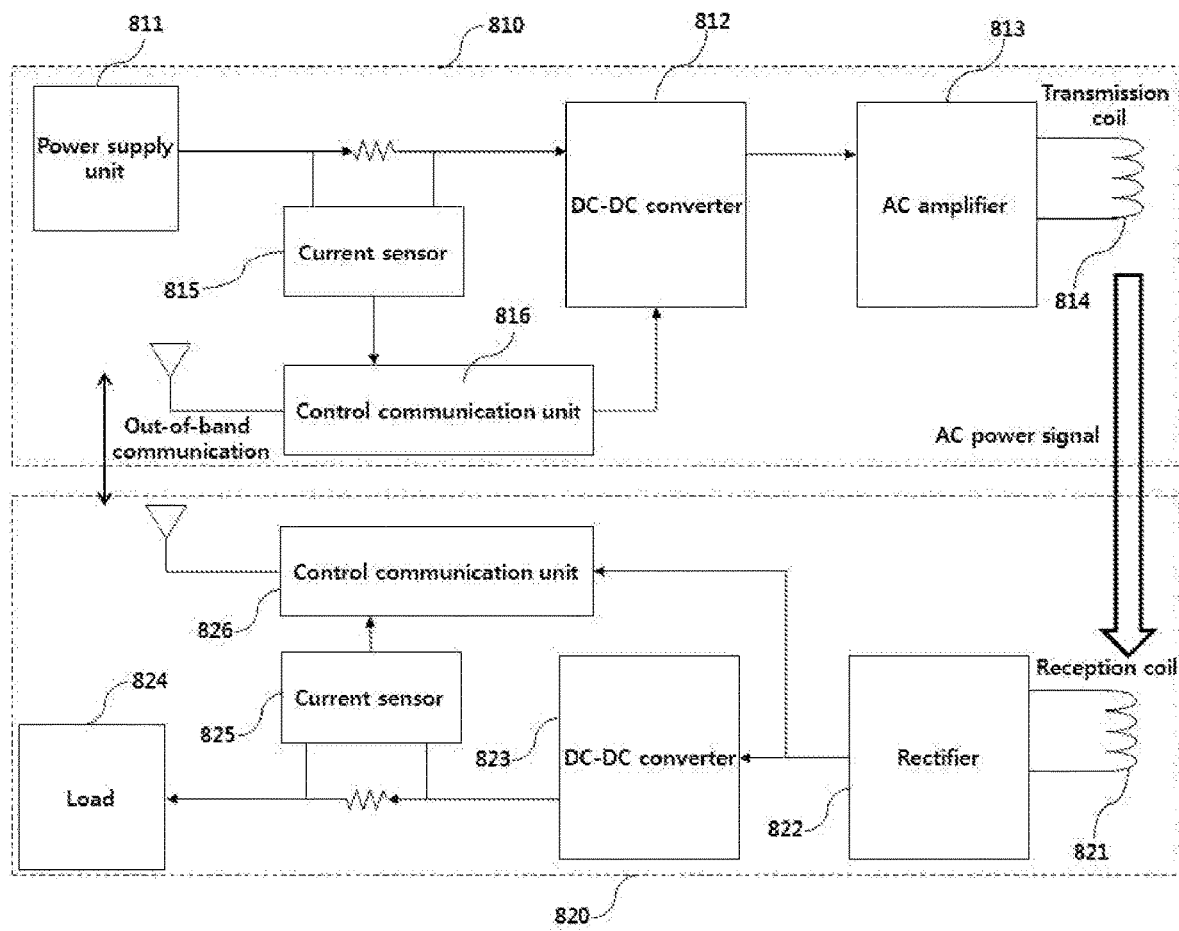
FIG. 8 is a diagram for describing a wireless power control method in a conventional wireless charting system.

FIG. 8 is a diagram for describing a wireless power control method in a conventional wireless charging system.

Specifically, FIG. 8 is a diagram for describing a wireless power control method in a wireless charging system which transmits a feedback signal through out-of-band communication.

Referring to FIG. 8, power supplied from a power supply unit 811 of a wireless power transmitter 810 is converted into specific DC power through a DC-DC converter 812. An AC amplifier 813 generates an AC power signal according to the converted DC power and transfers the AC power signal to a transmission coil 814. The AC power signal transmitted through the transmission coil 814 is received by a reception coil 821 of a wireless power receiver 820 and transferred to a rectifier 822. Output DC power of the rectifier 822 is transferred to a DC-DC converter 823 and converted into specific DC power required by a load 824.

Particularly, the conventional wireless power receiver 820 may monitor information about output power/voltage/current of the rectifier 822 and information about power/voltage/current transferred to the load 824. A control communication unit 826 of the wireless power receiver 820 may periodically transmit a predetermined power control request signal including a monitoring result to a control communication unit 816 of the wireless power transmitter 810 through out-of-band communication. For example, the predetermined power control request signal including a monitoring result may be a dynamic characteristic parameter packet defined in A4WP standard and out-of-band communication may be Bluetooth low energy communication at 2.4 GHz.

The control communication unit 816 of the wireless power transmitter 810 may dynamically control output power of the DC-DC converter 812 on the basis of the received power control request signal.

That is, the conventional wireless power transmitter 810 controls transmitted power on the basis of a feedback signal received from the wireless power receiver 820. Although a time required to actually control power on the basis of a feedback signal may vary according to a feedback signal transmission period, for example, 1.5 seconds or more is required, in general.

However, the conventional wireless transmitted power control method using a feedback signal has a problem that a feedback signal transmission period is not short enough to effectively control transmitted power in a situation in which a coupling coefficient between the transmission coil 814 and the reception coil 821 rapidly changes. Accordingly, it is impossible to provide appropriate power required by a receiver in a situation in which a coupling coefficient rapidly changes with a conventional wireless transmitted power control speed based on a feedback signal.

In the case of electromagnetic resonance, an impedance level at the transmission coil increases when the coupling coefficient between the transmission coil and the reception coil decreases. On the contrary, the impedance level at the transmission coil decreases when the coupling coefficient between the transmission coil and the reception coil increases.

Power transmission efficiency R_efficiency between the transmission coil and the reception coil is proportional to the coupling coefficient K of the transmission coil and the reception coil, Q_factor ($Q_t$) of the transmitter and Q_factor ($Q_r$) of the receiver, as represented by the following expression 2.

$$R\_efficiency = K^2 Q_t Q_r \qquad \text{Expression 2:}$$

As represented by Expression 2, power transmission efficiency decreases as the coupling coefficient between the transmission coil and the reception coil decreases and increases as the coupling coefficient increases.

That is, the phenomenon that the intensity of power received by the wireless power receiver decreases when the coupling coefficient between the transmission coil and the reception coil decreases is caused by decrease in the intensity of transmitted power and decrease in power transmission efficiency between the transmission coil and the reception coil when the impedance of the transmission coil increases.

For example, the coupling coefficient between the transmission coil and the reception coil may rapidly change to 0.1→0.05→0.2→0.01→0.3 for 0.5 seconds, during which the wireless power receiver rapidly moves. If a feedback signal is transmitted and thus power control is performed when the receiver has moved to a position at which the coupling coefficient is 0.1, and then the next feedback signal is transmitted when the receiver has moved to a position at which the coupling coefficient is 0.3, power control cannot be normally performed at positions corresponding to coupling coefficients of 0.05 and 0.01. That is, appropriate power may not be transmitted to the receiver at positions corresponding to coupling coefficients of 0.05 and 0.01.

Figure 9:
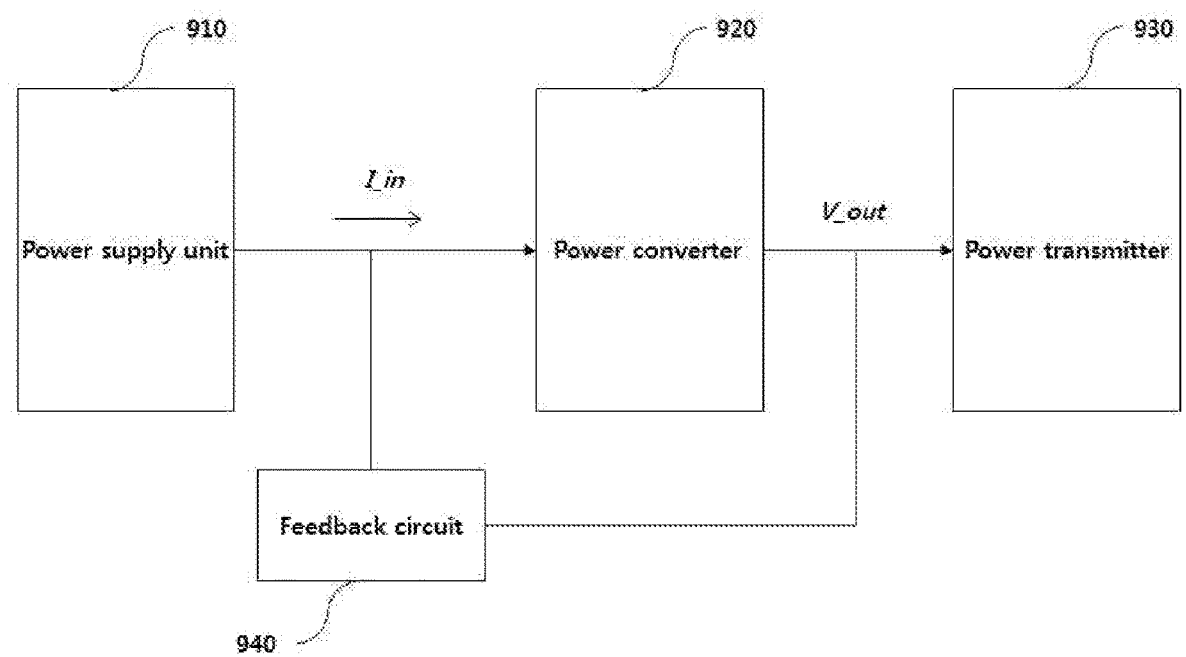
FIG. 9 is a block diagram for describing a configuration of a wireless power control device according to an embodiment of the present invention.

FIG. 9 is a block diagram for describing a configuration of a wireless power control device according to an embodiment of the present invention.

Referring to FIG. 9, the wireless power control device 900 may include a power supply unit 910, a power converter 920, a power transmitter 930 and a feedback circuit 940.

The feedback circuit 940 may control an output voltage V_out of the power converter 920 by detecting the intensity of current I_in flowing between the power supply unit 910 and the power converter 920.

Although a detailed configuration of the feedback circuit 940 according to an embodiment will be described later in detail with reference to FIG. 10, the present invention is not limited thereto and any circuit capable of controlling the output voltage of the power converter 920 such that the intensity of current input to the power converter 920 is kept uniform may be used as the feedback circuit 940.

Alternatively, the feedback circuit 940 is required only to maintain the amount of power transmitted through a transmission coil uniform irrespective of changes in the coupling coefficient between the transmission coil and a reception coil.

The power transmitter 930 may include a frequency generator for generating an AC signal having a specific frequency, an amplification circuit for amplifying the generated AC signal using an output DC voltage of the power converter, and a transmission coil for wirelessly transmitting the amplified AC signal. Further, the power transmitter 930 may further include a matching circuit for matching impedances between the power converter 920 and the transmission coil.

For example, it is assumed that the rated output power of the power supply unit 910 is 5 W and the output voltage thereof is 5V. Here, it is assumed that the power converter 920 converts DC 5V into DC 2.5V.

To maintain the intensity of power transmitted through the power transmitter 930 at 5 W, the intensity of current transferred from the power converter 920 to the power transmitter 930 needs to be maintained at 2A (5 W/2.5V) and the intensity of current applied from the power supply unit 910 to the power converter 920 needs to be maintained at 1A.

However, when the coupling coefficient between the transmission coil and the reception coil rapidly increases, the quantity of current transferred to the power transmitter 930 may rapidly increase and thus power equal to or greater than 5 W which is the rated output power of the power supply unit 910 may be required. In this case, the power transmitter may stop power transmission to a corresponding wireless power receiver.

To solve the aforementioned problem that power transmission is stopped, the wireless power control device 900 according to an embodiment of the present invention may adaptively decrease the output voltage V_out of the power converter 920 through the feedback circuit 940 to control the power of 5 W to be maintained when the quantity of current transferred to the power transmitter 930, that is, the intensity of current I_in input to the power converter 920 rapidly increases. FIG. 10 is a diagram for describing a structure of a wireless power control device including a feedback circuit according to another embodiment of the present invention.

The wireless power control device according to the present embodiment may operate by being included in a wireless power transmission device.

Figure 10:
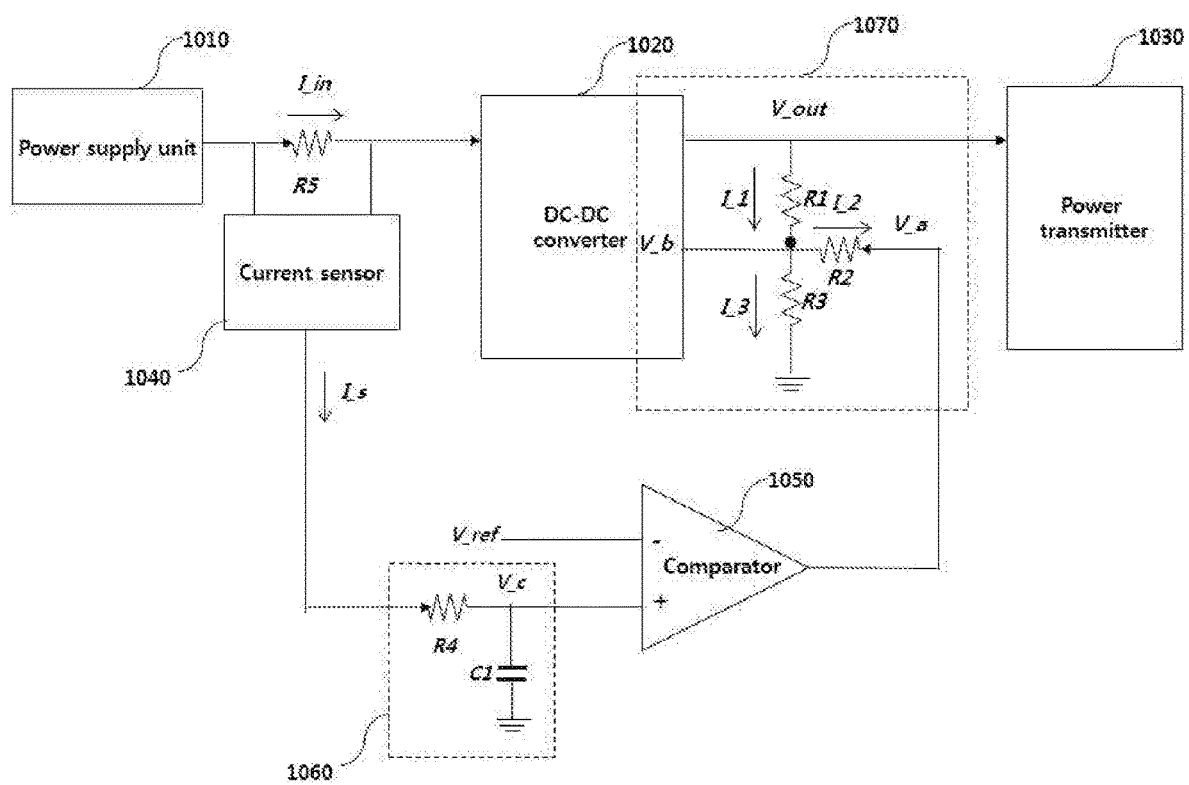
FIG. 10 is a diagram for describing a structure of a wireless power control device including a feedback circuit according to an embodiment of the present invention.

Referring to FIG. 10, the wireless power control device may include a power supply unit 1010, a DC-DC converter 1020, a power transmitter 1030, a current sensor 1040, a comparator 1050, an RC circuit 1060 and an output voltage control circuit 1070.

The current sensor 1040 may detect the intensity of current I_in input to the DC-DC converter 1020 in real time by measuring a voltage applied to a fifth resistor R5 positioned between the power supply unit 1010 and the DC-DC converter 1020.

The current sensor 1040 may transmit current I_s corresponding to the detected intensity of current I_in to the RC circuit 1060.

The RC circuit 1060, which is a circuit for controlling a rate of change of a voltage V_c applied to the comparator 1050 according to change of an output current value I_s of the current sensor 1040, may control a rate of change of an electrical state from one state to another state. That is, the RC circuit 1060 controls a time constant τ. A voltage V_c applied to a capacitor C1 in the RC circuit 1060 cannot instantaneously change according to the output current I_s of the current sensor 1040. Referring to reference numeral 1060, a voltage applied to a fourth resistor R4 according to the output current I_s of the current sensor 1040 can be applied to the capacitor C1 after a lapse of time corresponding to the time constant τ. Here, the time constant is calculated by multiplying the resistance value of R4 by the capacitance value of the capacitor C1. For example, when the resistance value of R4 of the RC circuit 1060 is 10 kΩ and the capacitance value of C1 is 1 μf, the time constant ti may be 10 ms (10 kΩ*1 μf). That is, the voltage applied to R4 can be applied to C1 after a lapse of 10 ms.

A predetermined reference voltage V_ref is applied to the negative terminal of the comparator 1050 and the voltage of the capacitor C1, V_c, is applied to the positive terminal thereof. Here, the output voltage V_out of the DC-DC converter 1020 may be controlled according to the output voltage V_a of the comparator 1050. The output voltage V_a of the comparator 1050 may be dynamically changed according to a difference between V_ref and V_c. Consequently, the output voltage V_a of the comparator 1050 may be dynamically changed with a predetermined delay according to change in the current I_in input to the DC-DC converter 1020.

Referring to reference numeral 1070, which is referred to as a voltage distribution circuit 1070 for convenience of description, in FIG. 10, the relationship between the output voltage V_a of the comparator 1050 and the output voltage V_out of the DC-DC converter 1020 is represented by the following equation 1. Referring to Equation 1, V_output is determined by V_a when V b is a constant. That is, V_out decreases when V_a increases and increases when V_a decreases. The output voltage V_out of the DC-DC converter 1020 is adaptively controlled through the feedback circuit according to an embodiment of the present invention and thus the current I_in input to the DC-DC converter 102 may be maintained uniform.

$$I\_1 = I\_2 + I\_3$$

$$[(V\_out - V\_b)/R1] = [(V\_b - V\_a)/R2] + [V\_b/R3]$$

$$V\_out = ([(V\_b - V\_a)/R2] + [V\_b/R3]) * R1 + V\_b =$$

$$V\_b(R1/R2 + R1/R3 + 1) - V\_a/R2$$

Equation 1

The wireless power control device according to the embodiment illustrated in FIG. 10 may include a feedback circuit including the current sensor which detects change in the intensity of current input to the DC-DC converter and the comparator configured to adaptively change the voltage of the output terminal of the DC-DC converter according to a detection result of the current sensor. The intensity of current input to the DC-DC converter can be maintained uniform through the feedback circuit. That is, the wireless power control device according to the present invention has the advantage of controlling uniform power to be received by a wireless power receiver irrespective of changes in the coupling coefficient between the transmission coil and the reception coil.

In addition, a wireless power transmission device including the feedback circuit according to the embodiment illustrated in FIG. 10 can provide uniform power irrespective of rapid movement of a wireless power receiver by maintaining the intensity of current input to the power converter, that is, the DC-DC converter, uniform.

Further, the wireless power transmission device including the feedback circuit according to the embodiment illustrated in FIG. 10 can also detect the intensity of current applied to the power converter for a period of time in which a feedback signal is not received through a feedback channel established between the wireless power transmission device and a wireless power receiver to control power rapidly and actively.

Figure 11:
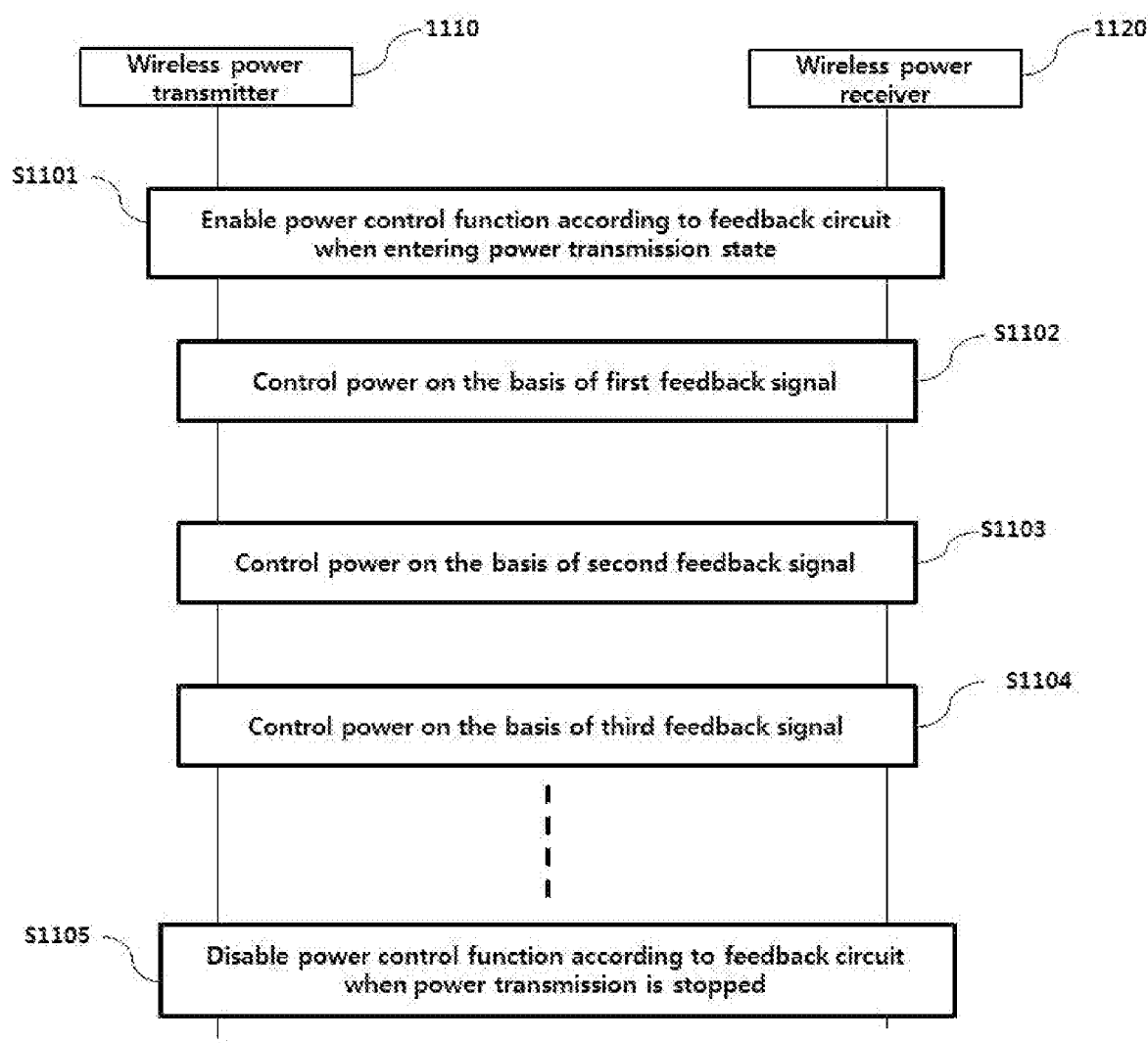
FIG. 11 is a flowchart for describing a wireless power control method in a wireless charging system according to an embodiment of the present invention.

FIG. 11 is a flowchart for describing a wireless power control method in a wireless charging system according to an embodiment of the present invention.

Referring to FIG. 11, a wireless power transmitter 1110 may enable a power control function according to a feedback circuit when entering a power transmission state (S1101).

Upon reception of a predetermined feedback signal requesting power control from a wireless power receiver 1120 during power control according to the feedback circuit, the wireless power transmitter 1110 may control power according to the received feedback signal (S1102 to S1104).

For example, the wireless power transmitter 1110 may continuously perform power control according to the feedback circuit until a second feedback signal is received after power control according to a first feedback signal.

When power transmission is stopped or charging is completed, the wireless power transmitter 1110 may disable the power control function according to the feedback circuit (S1105). In the above-described embodiment illustrated in FIG. 10, when the intensity of transmitted power is changed according to the feedback signal, the wireless power transmitter may control a new reference voltage corresponding to the changed intensity of transmitted power to be applied to the negative terminal of the comparator 1050.

In another embodiment of the present invention, when a charging mode of the wireless power receiver is changed through a predetermined negotiation procedure, the wireless power transmitter may control a new reference voltage corresponding to the changed charging mode to be applied to the negative terminal of the comparator 1050. For example, charging modes may include a normal charging mode and a high-speed charging mode, but the present invention is not limited thereto.

In another embodiment of the present invention, when the category of the wireless power receiver is changed through a predetermined negotiation procedure, the wireless power transmitter may control a new reference voltage corresponding to the changed category to be applied to the negative terminal of the comparator 1050. For example, the category of the wireless power receiver may be defined as shown in Table 2, but the present invention is not limited thereto.

In another embodiment of the present invention, when the class of the wireless power transmitter is changed through a predetermined control procedure, the wireless power transmitter may control a new reference voltage corresponding to the changed class to be applied to the negative terminal of the comparator 1050. For example, the class of the wireless power transmitter may be defined as shown in Table 1, but the present invention is not limited thereto. The class of the wireless power transmitter may be changed when an available power amount changes or a maximum power amount required by the wireless power receiver changes, but the present invention is not limited thereto.

The wireless power transmission device according to the embodiment illustrated in FIGS. 9 to 11 may further include the control communication unit 816 which establishes a communication channel with a wireless power receiver, receives a feedback signal through the established communication channel and controls power on the basis of the received feedback signal.

The control communication unit (not shown) according to an embodiment of the present invention may control not only the operation of the feedback circuit 940 but also a reference voltage applied to the comparator 1050 to be adaptively changed when at least one of the class of the wireless power transmitter and the category of the wireless power receiver changes.

Further, the control communication unit may control operations of the detailed components of the wireless power transmission device illustrated in FIGS. 9 and 10.

Figure 12:
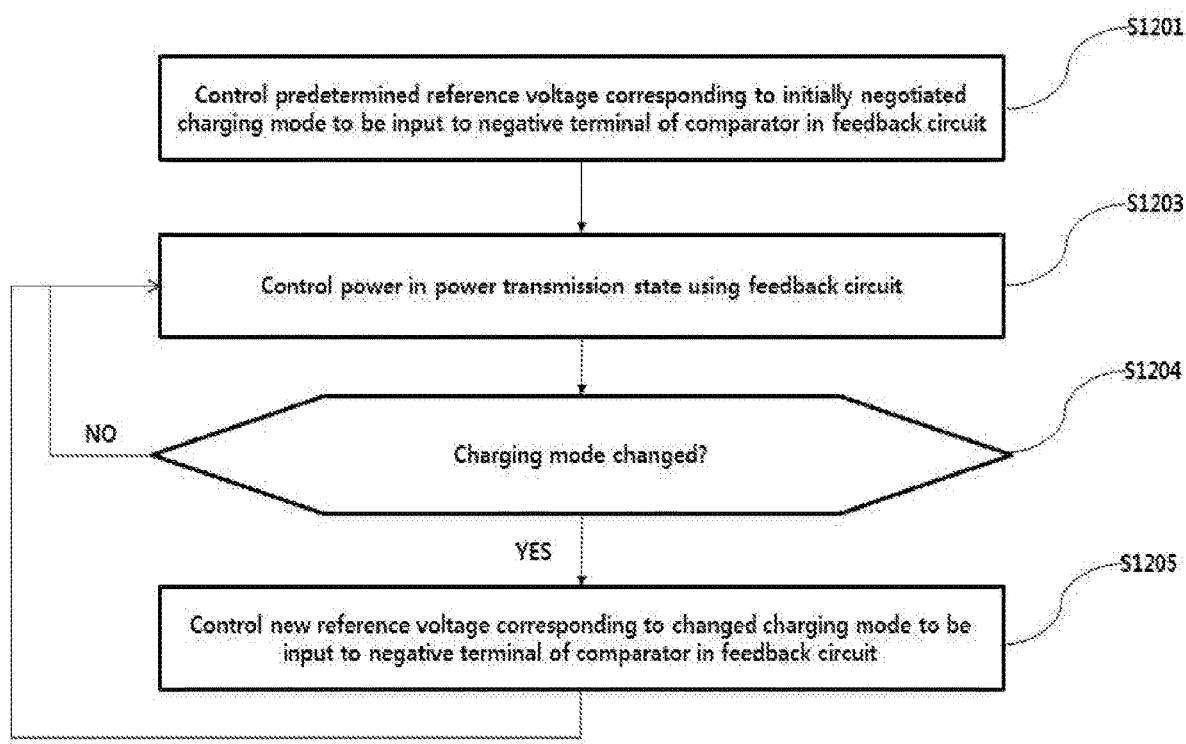
FIG. 12 is a flowchart for describing a wireless power control method in a wireless power transmission device according to an embodiment of the present invention.

FIG. 12 is a flowchart for describing a wireless power control method in a wireless power control device according to an embodiment of the present invention.

Referring to FIG. 12, the wireless power control device may control a predetermined reference voltage corresponding to a charging mode negotiated in an initial negotiation step to be applied to a negative terminal of a comparator in a feedback circuit (S1201).

The wireless power control device may control transmitted power to be maintained uniform in a power transmission state using the feedback circuit (S1203).

When the charging mode changes during power control using the feedback circuit, the wireless power control device may control a new reference voltage corresponding to the changed charging mode to be applied to the negative terminal of the comparator in the feedback circuit (S1204 and S1205).

For example, when the charging mode changes from a normal low-speed charging mode to a high-speed charging mode, power required by a wireless power receiver may change from 5 W to 10 W. In this case, the reference voltage applied to the negative terminal of the comparator may be doubled.

Although an example in which the reference voltage of the comparator is dynamically changed when the charging mode changes is described in the embodiment illustrated in FIG. 12, this is merely an embodiment and the reference voltage applied to the comparator of the feedback circuit may be dynamically changed when the category of the wireless power receiver, the class of the wireless power transmitter, or the like changes in another embodiment of the present invention.

Figure 13:
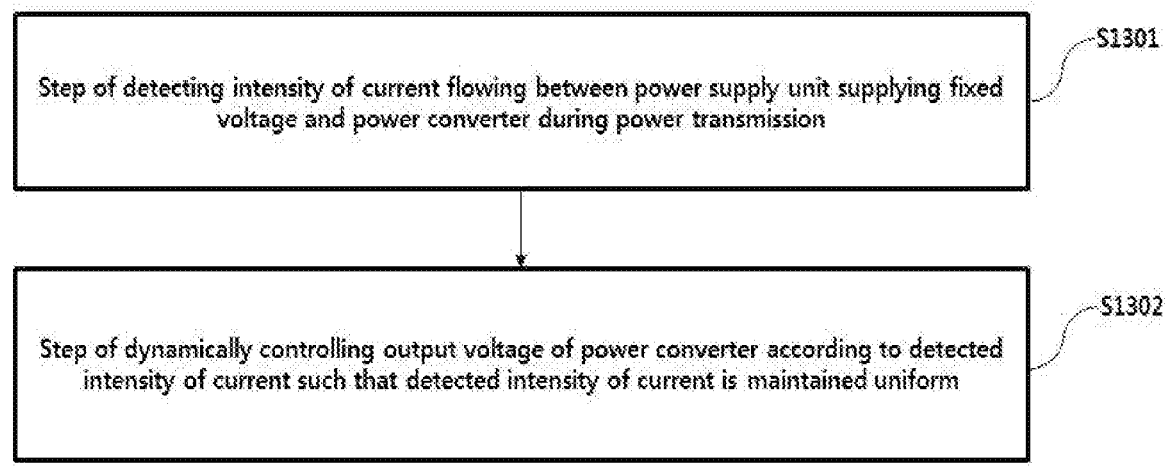
FIG. 13 is a flowchart for describing a wireless power control method in a wireless power transmission device according to another embodiment of the present invention.

FIG. 13 is a flowchart for describing a wireless power control method in a wireless power transmission device according to another embodiment of the present invention.

Referring to FIG. 13, a wireless power transmission device which wirelessly transmits power to a wireless power reception device may detect the intensity of current flowing between a power supply unit which supplies a fixed voltage and a power converter during power transmission (S1301).

The wireless power transmission device may adaptively control the output voltage of the power converter according to the detected intensity of current such that the intensity of current detected between the power supply unit and the power converter is maintained uniform (S1302).

Here, the output voltage of the power converter may be controlled by the output voltage of a comparator.

Further, the output voltage of the comparator may be determined by a predetermined reference voltage applied to the negative terminal of the comparator and a voltage applied to the positive terminal thereof in accordance with the detected intensity of current.

In addition, the voltage applied to the positive terminal of the comparator may be a voltage applied to a capacitor of an RC circuit which determines a time constant.

For example, the wireless power control method may further include a step of checking whether a charging mode has changed. When the charging mode has changed, a new predefined reference voltage corresponding to the changed charging mode may be applied to the negative terminal of the comparator.

Alternatively, the wireless power control method may further include a step of checking whether the class of the wireless power transmitter has changed. When the class has changed, a new predefined reference voltage corresponding to the changed class may be applied to the negative terminal of the comparator.

Alternatively, the wireless power control method may further include a step of checking whether the category of the wireless power receiver has changed. When the category has changed, a new predefined reference voltage corresponding to the changed category may be applied to the negative terminal of the comparator.

Further, the wireless power control method may further include a step of controlling power according to a predetermined feedback signal when the predetermined feedback signal for power control is received from the wireless power receiver during execution of the step of controlling the output voltage of the power converter.

Here, the feedback signal may be a dynamic characteristic parameter packet defined in the A4WP standard and received through an out-of-band communication channel.

Another embodiment of the present invention may provide a computer-readable recording medium in which a program for executing the above-described wireless power control methods in the wireless power transmitter is recorded.

In this case, the computer-readable medium is distributed to a computer system connected through a network and thus computer-readable code may be stored and executed therein. In addition, functional programs, code and code segments for realizing the above-described methods may be easily deduced by programmers in the art to which the embodiments pertain.

Those skilled in the art will appreciate that the present invention may be carried out in other specific ways than those set forth herein without departing from the spirit and essential characteristics of the present invention.

Accordingly, the above description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The present invention may be used in the field of wireless charging and, particularly, applied to wireless power transmission devices.

What is claimed is:

1. A wireless power control method in a wireless power transmission device for wirelessly transmitting power to a wireless power reception device, the method comprising:
   receiving a first feedback control signal from the wireless power reception device at a first time interval;
   sensing a current within the wireless power transmission device to generate a second feedback control signal at a second time interval;
   controlling a wireless power based on the first feedback control signal in response to a voltage change during displacement between the wireless power transmission and reception devices within the first time interval; and
   controlling the wireless power based on the second feedback control signal in response to a voltage change during load transients indicated by the sensed current within the wireless power transmission device,
   wherein the first time interval is longer than the second time interval.

2. The wireless power control method according to claim 1, wherein the controlling the wireless power includes maintaining a current within the wireless power transmission device for at least a certain period of the first time interval.

3. The wireless power control method according to claim 2, wherein an intensity of the wireless power is controlled by converting a voltage output at a power converter of the wireless power transmission device.

4. The wireless power control method according to claim 3, wherein the first feedback control signal is used by the wireless power transmission device to adjust the intensity of the wireless power.

5. The wireless power control method according to claim 4, wherein the current is input to the power converter of the wireless power transmission device.

6. The wireless power control method according to claim 3, wherein the second feedback control signal is used by the wireless power transmission device to maintain an intensity of current transferred to a power transmitter of the wireless power transmission device, and
   wherein the power transmitter includes an amplification circuit for amplifying an AC signal generated using an output DC voltage of the power converter.

7. The wireless power control method according to claim 1, wherein the second feedback control signal is used by the wireless power transmission device to maintain an intensity of current transferred to a power transmitter of the wireless power transmission device, and wherein the power transmitter includes a transmission coil.

8. The wireless power control method according to claim 1, wherein the first feedback control signal is received through a communication channel between the wireless power transmission device and the wireless power reception device.

9. A wireless power control method in a wireless power transmission device for wirelessly transmitting power to a wireless power reception device, the method comprising:

receiving a first control signal from the wireless power reception device at a first time interval;

sensing a current within the wireless power transmission device to generate a second control signal at a second time interval; and controlling a wireless power based on the first control signal and the second control signal, wherein the first time interval is longer than the second time interval, wherein the first control signal includes a digital signal, and wherein the second control signal includes an analog signal.

10. A wireless power control method in a wireless power transmission device for wirelessly transmitting power to a wireless power reception device, the method comprising:

receiving a first control signal from the wireless power reception device at a first time interval;

sensing a current within the wireless power transmission device to generate a second control signal at a second time interval; and controlling a wireless power based on the first control signal and the second control signal, wherein the first time interval is longer than the second time interval, wherein a coupling efficiency between a transmission coil of the wireless power transmission device and a reception coil of the wireless power reception device changes multiple times within the first time interval.

11. A wireless power transmission device for wirelessly transmitting power to a wireless power reception device, the wireless power transmission device comprising:

a communication and control unit configured to receive a first control signal from the wireless power reception device at a first time interval; and a feedback circuit configured to sense a current within the wireless power transmission device to generate a second control signal at a second time interval, wherein the communication and control unit controls a wireless power based on the first control signal and the second control signal, wherein the first time interval is longer than the second time interval, wherein the first control signal includes a digital signal, and wherein the second control signal includes an analog signal.

12. The wireless power transmission device according to claim 11, wherein the communication and control unit is configured to control the wireless power by maintaining a current within the wireless power transmission device for at least a certain period of the first time interval.

13. The wireless power transmission device according to claim 12, wherein an intensity of the wireless power is controlled by converting a voltage output at a power converter of the wireless power transmission device.

14. The wireless power transmission device according to claim 13, wherein the first control signal is used by the wireless power transmission device to adjust the intensity of the wireless power.

15. The wireless power transmission device according to claim 14, wherein the current is input to the power converter of the wireless power transmission device.

16. The wireless power transmission device according to claim 13, wherein the second control signal is used by the wireless power transmission device to maintain an intensity of current transferred to a power transmitter of the wireless power transmission device, and wherein the power transmitter includes an amplification circuit for amplifying an AC signal generated using an output DC voltage of the power converter.

17. The wireless power transmission device according to claim 11, wherein the second control signal is used by the wireless power transmission device to maintain an intensity of current transferred to a power transmitter of the wireless power transmission device, and wherein the power transmitter includes a transmission coil.

18. The wireless power transmission device according to claim 11, wherein the first control signal is received through a communication channel between the wireless power transmission device and the wireless power reception device.

19. The wireless power control device according to claim 11, wherein a coupling efficiency between a transmission coil of the wireless power transmission device and a reception coil of the wireless power reception device changes multiple times within the first time interval.

20. A wireless power transmission device for wirelessly transmitting power to a wireless power reception device, the wireless power transmission device comprising:

a communication and control unit configured to receive a first feedback control signal from the wireless power reception device at a first time interval; and a feedback circuit configured to sense a current within the wireless power transmission device to generate a second feedback control signal at a second time interval, wherein the communication and control unit controls a wireless power based on the first feedback control signal in response to a voltage change during displacement between the wireless power transmission and reception devices within the first time interval, and controls the wireless power based on the second feedback control signal in response to a voltage change during load transients indicated by the sensed current within the wireless power transmission device, and wherein the first time interval is longer than the second time interval.

* * * * *